US012776724B2

(12) United States Patent
Rehlaender et al.

(10) Patent No.: US 12,776,724 B2
(45) Date of Patent: Oct. 27, 2026

(54) FLYING-CAPACITOR INVERTER, MULTI-LEVEL PHASE-SHIFT CONVERTER, AND METHOD OF CONTROLLING THE FLYING- CAPACITOR INVERTER AND THE MULTI-LEVEL- PHASE- SHIFT CONVERTER

(71) Applicant: Delta Electronics (Thailand) Public Co., Ltd., Samutprakarn (TH)

(72) Inventors: Philipp Rehlaender, Paderborn (DE); Frank Schafmeister, Warburg (DE); Joachim Böcker, Berlin (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 564 days.

(21) Appl. No.: 18/363,720

(22) Filed: Aug. 1, 2023

(65) Prior Publication Data

US 2024/0048069 A1 Feb. 8, 2024

(30) Foreign Application Priority Data

Aug. 3, 2022 (EP) .................................... 22188576

(51) Int. Cl.
*H02M 7/483* (2007.01)
*H02M 1/00* (2007.01)
(Continued)

(52) U.S. Cl.
CPC ....... *H02M 7/4837* (2021.05); *H02M 1/0043* (2021.05); *H02M 1/0095* (2021.05); *H02M 3/01* (2021.05); *H02M 3/33571* (2021.05)

(58) Field of Classification Search
CPC .... H02M 1/0043; H02M 1/0095; H02M 3/01; H02M 3/33571; H02M 7/4837
See application file for complete search history.

(56) References Cited

U.S. PATENT DOCUMENTS

2009/0316443 A1 12/2009 Coccia et al.
2018/0183333 A1 6/2018 Uenaka et al.
(Continued)

FOREIGN PATENT DOCUMENTS

CN 100405723 C * 7/2008

OTHER PUBLICATIONS

Honggang Sheng et al., "A Fault Detection and Protection Scheme for Three-Level DC-DC Converters Based on Monitoring Flying Capacitor Voltage", pp. 685-697, IEEE Transactions on Power Electronics ( vol. 27, Issue: 2, Feb. 2012).
(Continued)

*Primary Examiner* — Jue Zhang
(74) *Attorney, Agent, or Firm* — CKC & Partners Co., LLC

(57) ABSTRACT

The disclosure concerns a flying-capacitor inverter, comprising a switch leg with four switches, a flying capacitor connected to the switch leg, an output between pairs of the switches, and a control device connected to each of the four switches, wherein the control device is configured to employ phase-shift modulation to switch the four switches such that switching signals for a first switch and a fourth switch of the four switches are phase shifted to the switching signals for a second switch and a third switch of the four switches. The disclosure also concerns a multi-level phase-shift converter comprising the flying-capacitor inverter, as well as a method for controlling the flying-capacitor inverter and/or the multi-level phase-shift converter.

20 Claims, 13 Drawing Sheets

(51) Int. Cl.
*H02M 3/00* (2006.01)
*H02M 3/335* (2006.01)

(56) References Cited

U.S. PATENT DOCUMENTS

| | | | | |
|---|---|---|---|---|
| 2021/0152100 | A1 | 5/2021 | Zilio | |
| 2021/0336547 | A1 | 10/2021 | Hirokawa et al. | |
| 2023/0291304 | A1 * | 9/2023 | Zhang ................. | H02M 1/0095 |

OTHER PUBLICATIONS

Ivan Z. Petric et al, "A Real-Time Estimator for Capacitor Voltages in the Flying Capacitor Multilevel Converter", 2022 IEEE 23rd Workshop on Control and Modeling for Power Electronics (COMPEL).

Philipp Rehlaender et al., "Alternating Asymmetrical Phase-Shift Modulation for Full-Bridge Converters with Balanced Switching Losses to Reduce Thermal Imbalances", 2021 IEEE Applied Power Electronics Conference and Exposition (APEC).

Philipp Rehlaender et al, "Frequency-Doubler Half-Bridge Modulation For Reduced Junction Temperatures in the Low- Gain Operation of the Isolated Full-Bridge Converter", 2022 International Power Electronics Conference (IPEC-Himeji 2022—ECCE Asia).

Philipp Rehlaender et al, "LLC Resonant Converter Modulations for Reduced Junction Temperatures in Half-Bridge Mode and Transformer Flux in the On-the-Fly Morphing Thereto", pp. 13413-13427, IEEE Transactions on Power Electronics ( vol. 37, Issue: 11, Nov. 2022).

Corresponding extended European search report issued on Jan. 26, 2023.

* cited by examiner

FLYING-CAPACITOR INVERTER, MULTI-LEVEL PHASE-SHIFT CONVERTER, AND METHOD OF CONTROLLING THE FLYING- CAPACITOR INVERTER AND THE MULTI-LEVEL- PHASE- SHIFT CONVERTER

CROSS-REFERENCE TO RELATED APPLICATION

This application claims priority to European Patent Application No. 22188576.7, filed on Aug. 3, 2022, which is hereby incorporated by reference in its entirety.

TECHNICAL FIELD

The present disclosure concerns a flying-capacitor inverter, a multi-level phase-shift converter as well as a method of controlling a flying-capacitor inverter and a multi-level phase-shift converter.

BACKGROUND

Flying-capacitor inverters that are known in the art commonly have the problem in that a flying capacitor voltage must be controlled to half of an input voltage to the inverter to ensure that switches thereof are only stressed with half of the input voltage and so as to avoid a dynamic increase of this voltage. Furthermore, conventionally known DC-DC-converters, power factor correction circuits and inverter stages, especially conventional half-bridge LLC converters, have high switching and conduction losses.

SUMMARY

It is an object of the present disclosure to provide a flying-capacitor inverter, a multi-level phase shift converter, and a method for controlling the flying-capacitor inverter and the multi-level phase shift converter, which provide low switching losses and low conduction losses. In particular, it is an object of the present disclosure to provide a flying-capacitor inverter which can be implemented in a high variety of converters, particularly DC-DC-converters and multi-level inverters, with low switching losses and low conduction losses as well as low stress on switches and a stable voltage input to the switches and/or output by the flying-capacitor inverter.

The solution of this object is solved by the features of the independent claim. The dependent claims concern advantageous embodiments of the present disclosure.

The object of the present disclosure is achieved by a flying-capacitor inverter. Therein, the flying-capacitor inverter comprises a switch leg with four switches, a flying capacitor connected to the switch leg, an output between pairs of the switches, and a control device connected to each of the four switches. The control device is configured to employ phase-shift modulation to switch the four switches such that switching signals for a first switch and a fourth switch of the four switches are phase shifted to the switching signals for a second switch and a third switch of the four switches. Further therein:

- a switch-state of the first switch and the second switch being ON is defined as switch-state ET+;
- a switch-state of the third switch and the fourth switch being ON is defined as switch-state ET−;
- a switch-state of the first switch and the third switch being ON is defined as switch-state FW+; and
- a switch-state of the second switch and the fourth switch being ON is defined as switch-state FW−;
- a transition from switch-state ET+ to ET− is defined as transition A; and
- a transition from switch-state ET− to ET+ is defined as transition B;
- the transition A with an interposed switch-state FW+ is defined as A+;
- the transition A with an interposed switch-state FW− is defined as A−;
- the transition B with an interposed switch-state FW+ is defined as B+;
- the transition B with an interposed switch-state FW− is defined as B−.

In an implementation, the four switches of the flying-capacitor inverter are connected, in series, between two terminals of the input voltage. Therein, in an implementation, a number of a switch (i.e. "first switch", "second switch", etc.) is to be understood as being defined from one terminal (for instance, the plus terminal) to the other, i.e. the "first" switch is the switch closest to the first terminal (for instance, the plus terminal) of the input voltage (and the farthest from the second terminal, i.e. the negative terminal), the "second" switch is the switch second-closest to the first terminal, the "third" switch is the switch second-closest to the second terminal, and the "fourth" switch is the switch closest to the second terminal (and the farthest from the first terminal). In other words, in an implementation, from the first terminal to the second terminal, the switches are arranged in order of first to fourth, in series in an implementation. In an implementation, the switches are, from the positive terminal to the negative terminal, arranged in order of first to fourth.

In the following, the first switch may also be referred to as "switch one", the second switch as "switch two", the third switch as "switch three", and the fourth switch as "switch four".

In an implementation, the output of the flying-capacitor inverter is between the second and the third switch. In an implementation, the output of the flying-capacitor inverter comprises, as an output, two output terminals. In an embodiment, a first terminal of the output of the flying-capacitor inverter is between the second and the third switch, and a second terminal of the output of the flying-capacitor inverter is connected to the second terminal of the input voltage with the switch leg interposed between the second output terminal of the flying-capacitor inverter and the second input terminal in an implementation.

In an implementation, the flying capacitor is connected with the switch leg at two connection terminals. In an implementation, a first connection terminal thereof is connected between the first switch and the second switch. Further, in an implementation, a second connection terminal thereof is connected between the third switch and the fourth switch.

In a preferable embodiment, in the switch-state ET+, all switches except for the first switch and the second switch are OFF. In an implementation, in the switch-state ET−, all switches except for the third switch and the fourth switch are OFF. In an implementation, in the switch-state FW+, all switches except for the first switch and third switch are OFF. In an implementation, in the switch-state FW−, all switches except for the second switch and the fourth switch are OFF. In the foregoing "all switches except for" stands for the remaining switches of the four switches. For example, in the switch-state ET+, the third switch and the fourth switch are OFF.

In an embodiment in which the flying-capacitor inverter comprises more than these four switches, these further switches may be ON or OFF, which is, in an implementation, independent of the aforementioned switch-states pertaining to the four switches of the switch leg.

In an implementation, the phase-shift modulation is complementary, i.e. in that no time-overlap of switches one and four and no time-overlap of switches two and three in ON states exists. Further, in an implementation, a short time lag (so called "dead time") instead of the aforementioned time-overlaps may exist so as to hinder overlap and so as to protect the switches from breakdown.

In an implementation, the transitions A, B, A+, B+, A−, B−, switch between the switch-states without overlap in time. In other words, for example during transition A+, the second switch and the third switch are not ON simultaneously at any given time.

In an implementation, when a sequence of transitions, as for example B+, A−, comprise a common switch-state therein, in this example common ET+ and ET−, this is to be understood as the respective switch-state being only switched once. In other words, in such a sequence of B+, A−, B+, A−, for example, switch-states ET+ and ET− are not switched to multiple times in succession. Further, in an implementation, these switch-states are also not held or kept switched for a prolonged, i.e. double amount of, ON/OFF time.

In one embodiment, the control device is configured to employ a phase-shift modulation in which the phase-shift modulation comprises the transitions in order B+, A− and/or comprises the transitions in order B−, A+.

In an implementation, the control device is configured to employ the phase-shift modulation by repeating the transitions B+, A− and/or B−, A+, so for example the phase-shift modulation comprises transition sequences of B+, A−, B+, A− . . . etc. and/or B−, A+, B−, A+ . . . etc.

In an implementation, in sequences of the repetition of transitions B+, A−, the switches four and one are considered lagging switches and the switches two and three are considered leading switches. Further, in an implementation, in sequences of the repetition of transitions B−, A+, the switches three and two are lagging switches and the switches one and four are leading switches.

In an implementation, the control device is configured to employ the transitions B+, A−, B−, A+ and/or B−, A+, B+, A− and/or repetitions thereof. In other words, in an implementation, the transitions B+, A− and B−, A+ are alternatingly repeated.

Further, in an implementation, the control device is configured to employ combinatorial repetitions thereof. In other words, in an implementation, the control device is configured to employ alternating repetitions of B+, A− and B−, A+ such that, in order, B+, A− and B−, A+ are alternated, but not necessarily alternating immediately. "Alternating immediately" herein means, for example, B+, A−, B−, A+ and then B+, A−, B−, A+ again, such that the sequence B+, A− and the sequence B−, A+ alternate one directly after the other. In contrast, in an implementation, also sequences of B+, A−, B+, A−, B−, A+, B−, A+ . . . are possible, wherein B−, A+ does not always directly follow B+, A−, and vice versa. Of course, in an implementation, more than double repetitions (B+, A−, B+, A−, B−, A+, B−, A+) of the B+/−, A−/+ sequences are possible, such as triple repetitions (B+, A−, B+, A−, B+, A−, B−, A+, B−, A+, B−, A+) or more than triple repetitions.

In an implementation, the flying-capacitor inverter outputs a periodic AC voltage. Therein, a time period of the periodic voltage output by the flying-capacitor inverter is defined as T.

In an implementation, the aforementioned transition sequences of B+, A− or B−, A+ are each carried out during one period T. In other words, two transitions of B+/− and A−/+ constitute one period T.

In an implementation, the sequence B+, A− produces a net negative current flowing through the flying capacitor. In an implementation, the sequence B−, A+ produces a net positive current flowing through the flying capacitor. By being configured to repeat and alternate (either alternating immediately or not immediately as explained above) the sequences B+/− and A−/+, the control device is configured to produce a net zero current flowing through the flying capacitor when integrated over multiple time periods T. In other words, in an implementation, the control device is configured to balance the sequences B−, A+ with the sequences B+, A− so as to produce a net zero current flowing through the flying capacitor. Thereby, in an implementation, a voltage level of the flying capacitor is kept constant over multiple time periods T.

In an implementation, the control device is configured to balance the sequences B−, A+ with the sequences B+, A− in dependence on the voltage level of the flying capacitor, which is measured directly and/or indirectly in an implementation.

In an implementation, in the foregoing described phase-shift modulation, turn ON intervals of the switches are all substantially the same. That is, over one or more time periods T, all switches will have been ON for the same amount of time, and respectively OFF for the same amount of time. Essentially, this is referred to as "symmetrical" phase-shift modulation.

In an implementation, during the phase-shift modulation, the control device is configured to set interval lengths of the switch-states to (1−D)T/2 and DT/2, wherein D is a duty cycle and T is the time period of periodic voltage output by the flying-capacitor inverter.

In an implementation, DT/2 describes, in the phase-shift modulation, a time shift or time delay between two switches, for example between switch one and switch three and/or switch two.

In an implementation, the duty cycle D is determined based on a control of the output voltage. For example, in case the output voltage is measured at lower than necessary, D is increased, and in case the output voltage is measured at higher than necessary, D is decreased.

In an implementation, the control device is configured to set the duty cycle to ½ (0.5), such that all switches are respectively on for half of the time period T, i.e. 0.5 T. Since two switches are always on at any given time in an implementation, this means that in total four ON intervals are comprised in a single time period T.

Of course, in an implementation, the ON periods for switches and/or switch-states are to be understood as being subject to tolerances, for example subject to the foregoing described dead times.

In an implementation, the control device is configured to set an interval length of the switch-states FW+ and/or FW− to (1−D)T/2, and the interval length of switch-states ET+ and/or ET− to DT/2 in an implementation, respectively.

In an implementation, the control device is configured to employ asymmetrical phase-shift modulation. Therein, turn ON interval lengths of the switches differ from one another. In other words, over one or more time periods T, predetermined switches will have been ON for time amounts differing from one another, and respectively OFF for time amounts differing from one another. Essentially, this is referred to as "asymmetrical" with respect to the phase-shift modulation.

In an implementation, the control device is configured to, during the asymmetrical phase-shift modulation, alternate turn ON interval lengths of the switches between DT/2 and (2−D)T/2, wherein D is the duty cycle and T is the time period of a periodic voltage output.

In an implementation, the control device is configured to set an interval length of the switches such that an interval length of for example the switch-states FW+, ET+, FW+(or, for example, FW−, ET−, FW−) is (2−D)T/2, i.e. the ON time of switches one and three is (2−D)T/2. Further therein, in an implementation, an interval length of the switch-state ET− and/or ET+ is set to DT/2, i.e. the ON time of switches two and four.

For instance, in an implementation, in the asymmetrical phase-shift modulation, the ON times of switch one are (2−D)T/2 whereas the ON times of switch four are DT/2. Further, in an implementation, the ON times of switch two are DT/2 and the ON times of switch three are (2−D)T/2. In other words, in an implementation, in the asymmetrical phase-shift modulation, switches one and three are, over one or more time periods T, ON for longer than switches two and four. Thereby, in an implementation, the net current flowing through the flying capacitor is zero, integrated over one or more time periods T.

Further, for instance, in an implementation, in the asymmetrical phase-shift modulation, the ON times of switch four are (2−D)T/2 whereas the ON times of switch one are DT/2. Further, in an implementation, the ON times of switch three are DT/2 and the ON times of switch two are (2−D) T/2. In other words, in an implementation, in the asymmetrical phase-shift modulation, switches four and two are, over one or more time periods T, ON for longer than switches one and three. Thereby, in an implementation, the net current flowing through the flying capacitor is zero, integrated over one or more time periods T.

In an implementation, the control device is configured to employ asymmetrical phase-shift modulation in which the asymmetrical ON times as described in the foregoing are alternated. In other words, for instance, during one or more time periods T, switch one may be ON for (2−D)T/2, i.e. longer, and switch four may be ON for DT/2, but in one or more time periods following this, switch one is ON for DT/2, and switch four is ON for (2−D)T/2. The same is applied to switches two and three in an implementation. Thereby, in an implementation, the control device is configured to spread heat generation among the four switches evenly over multiple time periods T while also keeping the net current flowing through the flying capacitor zero.

In an implementation, the control device is configured to alternate the ON times as described in the foregoing in dependence on the flying capacitor voltage, measured directly and/or indirectly in an implementation.

In an implementation, during the asymmetrical phase-shift modulation, the control device is configured to employ the transitions in order B+, A+ and/or the transitions in order A−, B−.

As also with regard to the above phase-shift modulation, in an implementation, the control device is configured to employ repetitions of these transition sequences B+, A+ and A−, B−, either immediately alternating or not immediately alternating (double or triple or more repetitions).

In an implementation, the control device is configured to, during the asymmetrical phase-shift modulation, comprise the transitions of a repetition in order B+, A+ and/or comprise the transitions of a repetition in order of A−, B−, and/or comprise the transitions in order of B+, A+, B−, A− and/or comprise the transitions in order of A−, B−, A+, B+.

Further, in an implementation, the control device is configured to employ asymmetrical phase-shift modulation comprising combinatorial repetitions of these foregoing transition sequences of B+, A+ and B−, A− so for example: B+, A+, B−, A−, B+, A+. In a not immediately alternating repetition, the control device is configured to switch as double or triple or more repetitions between sequences of B+, A+ and B−, A−, so for example: B+, A+, B+, A+, B−, A−, B−, A− or also B+, A+, B+, A+, B−, A−, B+, A+, for example.

Further, in an implementation, the control device is configured to control one or more of the transitions of switch-states in dependence of a measured current flowing through the flying-capacitor and/or configured to control one or more of the transitions of switch-states in dependence of the measured voltage of the flying capacitor.

In an implementation, the control device is configured to control one or more transition(s), especially a phase-shift between the transitions and/or a timing of the transitions, by adding a duty cycle control to the duty cycle of the switches. In the following, the value of duty cycle control will also be referred to as "ΔD".

In an implementation, the addition of a duty cycle control ΔD to the duty cycle is in addition or alternatively to the aforementioned control in dependence of a measure current and/or measured voltage of the flying capacitor. In addition or alternatively thereto, the duty cycle control ΔD is controlled in dependence on a measured temperature of one or more switches.

Further, in an implementation, the control device is configured, via a comparator and/or an addition operator in an implementation, to compare the voltage of the flying capacitor with half of the input voltage input into the flying-capacitor inverter.

In an implementation, the control device is configured to control one or more transitions, especially their timing, of switch-states in dependence of a measured temperature of the four switches. In an implementation, the inverter comprises one or more temperature sensors for sensing a temperature of the switches, especially for sensing a temperature of each switch individually. In addition or alternatively thereto, the temperature of one or more switches is measured by indirectly measuring current and/or voltage levels.

For instance, during the transition A+, in which first switches one and two are ON (state ET+), switch two is turned OFF and switch three is turned on (FW+), and then switch one is turned OFF and switch four is turned ON (ET−), a positive current will flow through the flying capacitor, thereby lowering its voltage. Therefore, the control device is configured to follow the transition A+ with a transition B+, in which a negative current will flow through the flying capacitor. In sum, the net current over these two transitions is zero and the flying capacitor voltage stays stable, at half the input voltage in an implementation. The same applies to A− (negative current) and B−(positive current). Over a predetermined number of time periods T, the control device is thus configured to switch between A+, B+ and/or A−, B−, or respective combinations of these sequences in dependence of the measured current of the flying capacitor so as to reduce or make zero the net current flowing through or from the flying capacitor and thus keeping the voltage thereof stable, at half the input voltage in an implementation.

In an implementation, the control device is configured to switch between the aforementioned transitions and set sequences of these transitions and/or their timing in dependence of a measured voltage of the flying capacitor.

In the case of the control device, in an implementation, controlling one or more transition(s) of switch-states by adding ΔD to the duty cycle of the switches, such duty cycle controls lead to delays in switching, i.e. phase-shifts, so as to cause a flying capacitor current that is non-zero, such that the flying capacitor voltage experiences run-off, i.e. is varied. Thereby, the control device is configured to offset a run-off of the flying capacitor voltage due to, for example, device tolerances (for instance, temperature dependencies and/or near-maximum switching speed of switches, etc.). In such cases, the resulting duty cycle is controlled by the control device to being D'=D+ΔD, wherein D is the foregoing described duty cycle (regular or ideal duty cycle) and ΔD is the aforementioned added duty cycle control value. In other words, in an implementation, the control device measures a current or voltage at the flying capacitor and sets ΔD so as to compensate for any voltage changes thereof, so as to keep the flying capacitor voltage stably at half the input voltage in an implementation.

In an implementation, if the flying capacitor voltage is measured as being lower than half of the input voltage, the control device is configured to set switches two and three as lagging switches. In an implementation therein, the control device is configured to employ the foregoing described transitions B−, A+, B−, A+. In an implementation, if the flying capacitor voltage is measured as being higher than half of the input voltage, the control device is configured to set switches one and four as legging switches. In an implementation therein, the control device is configured to employ the foregoing described transitions B+, A−, B+, A−. In other words, the control device is configured to switch between the transitions depending on a measured voltage of the flying capacitor and depending on a value resulting from comparing the measured voltage with the input voltage, with half the input voltage in an implementation.

Further, in an implementation, the control device is configured to set the switches two and three as leading switches and the switches one and four as lagging for ΔD>0 and set the switches two and three as lagging switches and the switches one and four as leading for ΔD<0. For ΔD>0, the resulting duty cycle is increased. For ΔD<0, the resulting duty cycle is decreased. In an implementation, by setting ΔD>0, the flying capacitor voltage is decreased. Further, in an implementation, by setting ΔD<0, the flying capacitor voltage is increased.

In an implementation, the control device is configured to employ an alternating-asymmetrical phase-shift modulation. Therein, the alternating-asymmetrical phase-shift modulation comprises as the transitions a repetition in order of B+, A− and/or a repetition in order of B−, A+. Further, in an implementation, the alternating-asymmetrical phase-shift modulation comprises as transitions in order B+, A−, B−, A+ and/or as transitions in order B−, A+, B+, A−. Further, in an implementation, the asymmetrical phase-shift modulation comprises combinatorial repetitions of the foregoing, such as for example B+, A−, B+, A−, B−, A+, B−, A+. Herein, as also described in the foregoing, sequences comprising double or triple or more transition sequences of B+, A− and/or B−, A+ are possible. Further, immediately alternating transition sequences such as B+, A−, B−, A+, B+, A−, B−, A+ or B−, A+, B+, A−, B−, A+, B+, A− are possible.

Further, in an implementation, in the alternating-asymmetrical modulation, the control device is configured to set turn ON intervals of the respective switches to (2−D)T/2, T/2, DT/2, and T/2 for two sequential time periods T (i.e. 2T) with duty cycle D. For example, switch three is on for (2−D)T/2, switch two is on for T/2, switch three is on for DT/2, and switch two is on for T/2 within two periods 2T for the leading leg. Likewise, switch four is on for DT/2, then switch one is on for T/2, then switch four is on for (2−D)T/2, and then switch one is on for T/2 within two periods 2T for the lagging leg. In an implementation therein, pulses of the switches one and four are thereby shifted to switches two and three by T. Thereby, in an implementation, the control device controls the transitions so as to alternate between two periods of negative current and two periods of positive current through the flying capacitor, thereby over multiple time periods T resulting in a net zero current (balanced flying capacitor current) and thus stable flying capacitor voltage. In an implementation therein, the control device is configured to set the transitions in order as B+, A−, B−, A+.

In an implementation, the control device comprises two pulse width modulation (PWM) counter units, wherein each of the two PWM counter units is configured to control a switch-state of two out of the four switches. In particular, the PWM counters units are up-down counters.

In an implementation, by employing two PWM counter units, the control device is configured to use a single synchronized up-down counter. Therein, compare values for one PWM unit are (2−D)N/4 and N−DN/4, while for the other PWM unit the compare values are DN/4 and (2+D)N/4 for achieving the foregoing described turn ON intervals of (2−D)T/2, T/2, DT/2, and T/2. Therein, "N" is a variable which corresponds, in PWM counter units, to a number of steps per time period, and may be normed such that for example N/T=1 or N/T=−1. In an implementation, N sets a top value of the PWM counter, thereby essentially defining a counter slope of the PWM counter unit(s). During an up-count, the flying capacitor current is negative in an implementation. After a down-count, the net flying capacitor current is positive in an implementation.

Further, in an implementation, the control device is configured to control the flying capacitor voltage by modifying the compare values for the up- and down count respectively by increasing or decreasing freewheeling intervals during a respective counter slope. Therein, the two upper compare values are modified to (2+D−ΔD)N/4 and N−(D−ΔD)N/4, whereas the lower two compare values are modified to (2−D+ΔD)N/4 and (D−ΔD)N/4, wherein ΔD is set by the control device so as to balance the flying capacitor current.

In an implementation, for setting ΔD, the inverter, especially the control unit of the inverter, comprises one or more logic circuits.

Further, in an implementation, the inverter comprises a measuring means for measuring a flying capacitor voltage. For example, in an implementation, the inverter comprises a voltage sensor unit connected to the flying capacitor. In an implementation, the voltage sensor unit outputs a voltage value to the control unit, especially to the one or more logic circuits.

In an implementation, no further components are disposed between the four switches of the flying-capacitor inverter. In particular, in an implementation, no active components are disposed between the four switches. In other words, in an implementation, the four switches of the flying-capacitor inverter are directly connected to one another, in series in an implementation, with only the flying capacitor connected between switches one and two and between switches three and four and the first output terminal of the flying-capacitor inverter being connected between switches two and three.

In an implementation, one or more or all switches of the four switches is a MOSFET. In addition, or alternatively thereto, in an implementation, one or more or all switches of the four switches is an IGBT. In an implementation, each of the four switches is connected to a diode, especially an anti-parallel diode. In the case of MOSFETs as one or more or all switches, the diodes are body-diodes of the MOSFETs in an implementation.

In an implementation, the foregoing described embodiments of control methods for the flying-capacitor inverter may be suitably combined. For instance, in an implementation, the different control methods are carried out sequentially. In an implementation, the control unit is configured to carry out the control methods sequentially, for example depending on a measured voltage of the flying capacitor and/or for example depending on measured temperatures of the switches.

The present disclosure also concerns a method of controlling a flying-capacitor inverter. Therein, the foregoing discussed operations and control steps, for which the control device is configured to carry out, are to be understood as method steps of controlling a flying capacitor inverter.

The present disclosure also concerns a multi-level phase-shift converter. Therein, the multi-level phase-shift converter comprises the flying-capacitor inverter according to any one of the foregoing described embodiments.

Further, in an implementation, the multi-level phase-shift converter comprises a transformer with a rectifier circuit. The multi-level phase-shift converter also comprises a blocking capacitor in an implementation. In an implementation therein, the transformer is connected to the first output terminal of the flying-capacitor inverter, i.e. the output terminal between switches two and three of the flying-capacitor inverter, and to the second output terminal of the flying-capacitor inverter. In an implementation, the multi-level phase-shift converter comprises an inductance connected between, especially directly between, the transformer and the first output terminal of the flying-capacitor inverter. Further, the multi-level phase-shift converter comprises the blocking capacitor between, especially directly between, the transformer and the second output terminal of the flying-capacitor inverter. The blocking capacitor is used to block half the input voltage in an implementation and comprises a large capacitance in an implementation such that the blocking voltage is fairly constant. Further, on the output-side of the transformer, the multi-level phase-shift converter comprises the rectifier circuit. Therein, the output of the transformer is connected to two diode legs connected in parallel, each of which comprises two diodes in series. The outputs of the transformer are each connected to one diode leg in an implementation, in particular between the two diodes of each diode leg. Further, in an implementation, the rectifier circuit comprises a capacitor leg in parallel with the diode legs at an output of the multi-level phase-shift converter. Between the capacitor leg and the diode legs, the rectifier circuit comprises an inductance in an implementation.

In an implementation, the rectifier circuit is a center-tapped rectifier.

In an implementation, the multi-level phase-shift converter comprises the flying-capacitor inverter and a half-bridge LLC resonant converter. In an implementation, the half-bridge LLC resonant converter comprises a splitted resonance capacitor.

In an implementation therein, the splitted resonance capacitor is comprised of two capacitors connected in series on a resonance capacitor leg. The resonance capacitor leg is connected in parallel to the four switches of the flying-capacitor inverter in an implementation. Further, the half-bridge LLC is connected to the first output terminal of the flying-capacitor inverter and the resonance capacitor leg. In other words, an input of a transformer of the half-bridge LLC is connected between the resonance capacitor leg and the first output terminal of the flying-capacitor inverter.

In an implementation, the multi-level phase-shift converter is a three-level phase-shift converter.

The present disclosure also concerns a method of controlling a multi-level phase-shift converter according to the foregoing advantageous embodiments. Therein, phase-shift modulation as explained in the foregoing with respect to the control device is employed to switch the four switches such that switching signals for a first switch and a fourth switch of the four switches are phase-shifted to the switching signals for a second switch and a third switch of the four switches.

With these configurations, the present disclosure achieves a multi-level phase-shift converter in which a conventional half-bridge leg is replaced by a flying-capacitor inverter. Thereby, a multi-level phase-shift converter is achieved with a beneficial figure of merit and low losses.

Further, in an implementation, the present disclosure achieves a flying-capacitor inverter which is implemented in DC-DC-converters, power factor correction circuits and/or inverter stages.

BRIEF DESCRIPTION OF DRAWINGS

Further details, advantages, and features of the present disclosure are described in more detail with reference to the accompanying figures. Therein.

DESCRIPTION OF EMBODIMENTS

Figure 1:
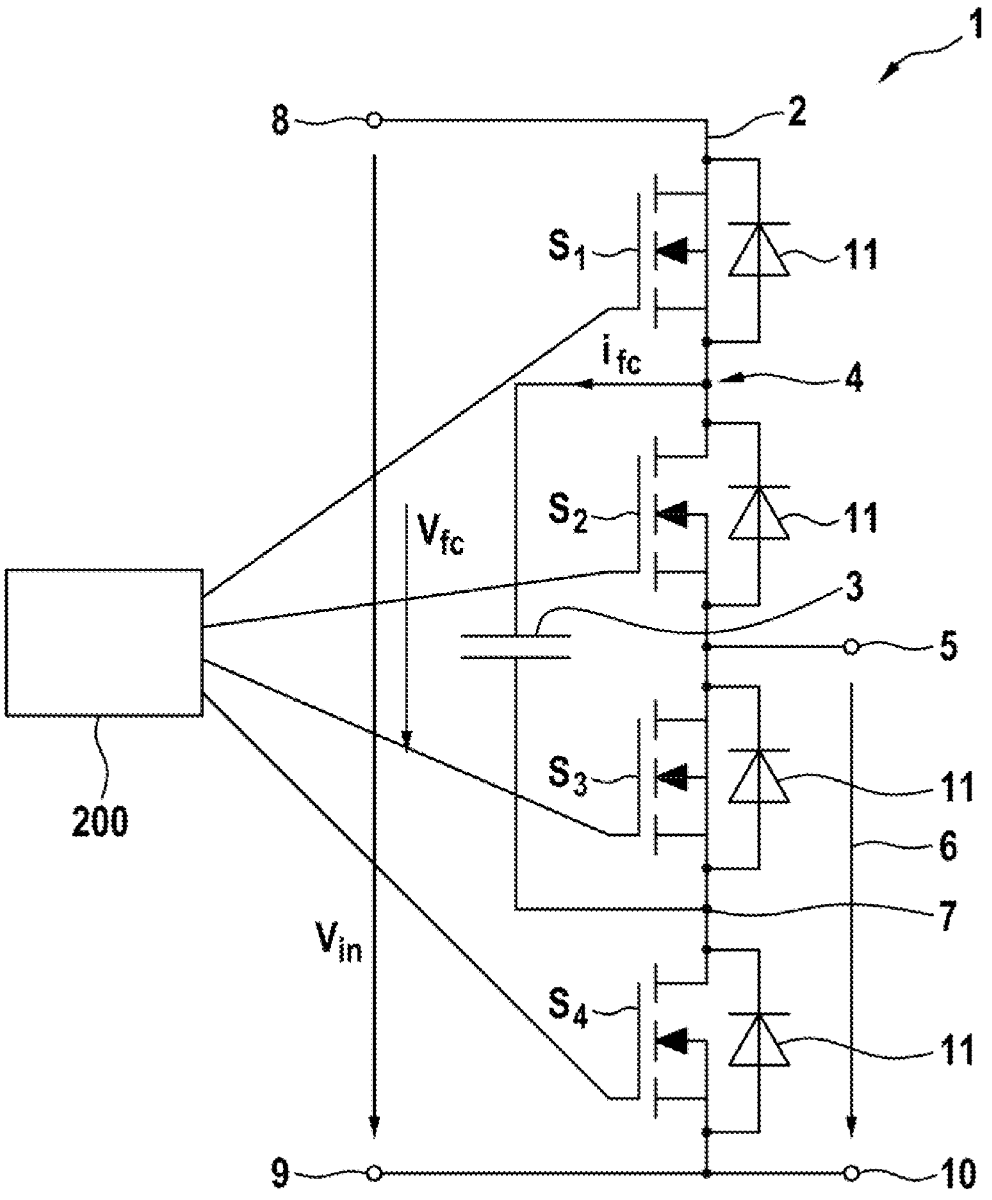
FIG. 1 shows a circuit diagram of a flying-capacitor inverter according to a first embodiment of the present disclosure.

FIG. 1 shows a circuit diagram of a flying-capacitor inverter 1 (in the following: "the inverter 1") according to a first embodiment of the present disclosure.

Therein, the inverter 1 comprises four switches, namely switch one S1, switch two S2, switch three S3, and switch four S4 on a switch leg 2. The switches S1-S4 are connected to each other, especially directly, in series. Each of the four switches S1-S4 comprises a diode 11, especially a body diode 11 in the exemplary case of MOSFETs as switches S1-S4.

Further, the inverter 1 comprises a flying capacitor 3. The flying capacitor 3 is connected to the switch leg 2 at a first connection point 4 between switch one S1 and switch two S2 as well as at a second connection point 7 between switch three S3 and switch four S4. The flying capacitor is charged (depending on switch-states, as will be explained below) to Vin/2, such that a capacitor voltage Vfc=Vin/2.

As shown in FIG. 1, the inverter 1 is connected to an input voltage Vin at input terminals 8, 9. The input voltage, referred to as "Vin". Further, the inverter 1 comprises a first output terminal 5 and a second output terminal 10 for outputting an inverter output voltage 6, referred to as "vine". In an implementation, the first output terminal 5 is connected between switch two S2 and switch three S3, directly between the two switches S2, S3 in an implementation. Further, the second output terminal 10 is connected with the second input terminal 9, with the switch leg 2 (the fourth switch S4) being connected thereto in an interposed manner.

The inverter 1 is connected to and controlled by a control device 200 in an implementation. The control device 200 is connected to the gate of each of the switches S1-S4 to control a switching operation thereof for outputting the inverter output voltage 6.

With reference to the following figures and embodiments, a control method for controlling the inverter 1 shown in FIG. 1 will be discussed. The following method steps are to be understood as implemented as a control method of the inverter 1, and especially as implemented as configurations of the aforementioned control device 200 of the inverter 1.

FIGS. 2 to 5 each show a switch-state of the flying-capacitor inverter 1 according to the first embodiment of the present disclosure.

Figure 2:
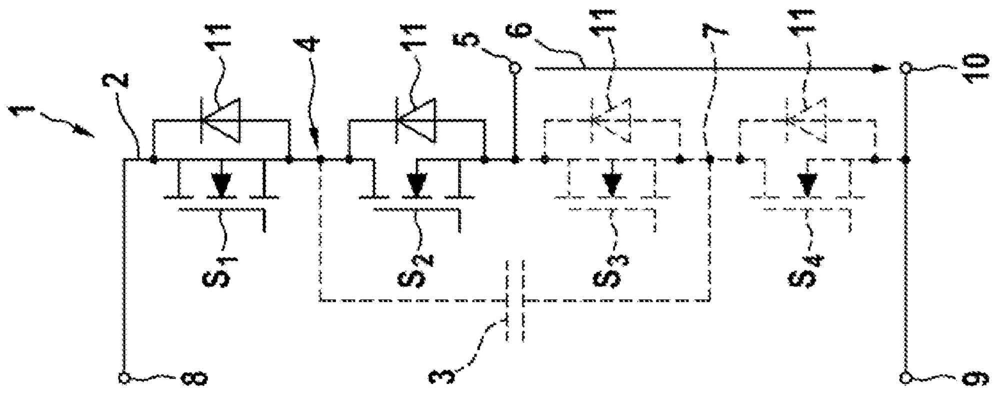

In FIG. 2, a switch-state defined or denoted as "ET+" is shown. Therein, switch one S1 and switch two S2 are ON. Further, switch three S3 and switch four S4 are OFF. As shown in FIG. 2, a current flows through switch one S1 and switch two S2 to the inverter output 6. The voltage output 6 vine thus outputs the input voltage, namely Vin, i.e. vinv=Vin.

Figure 3:
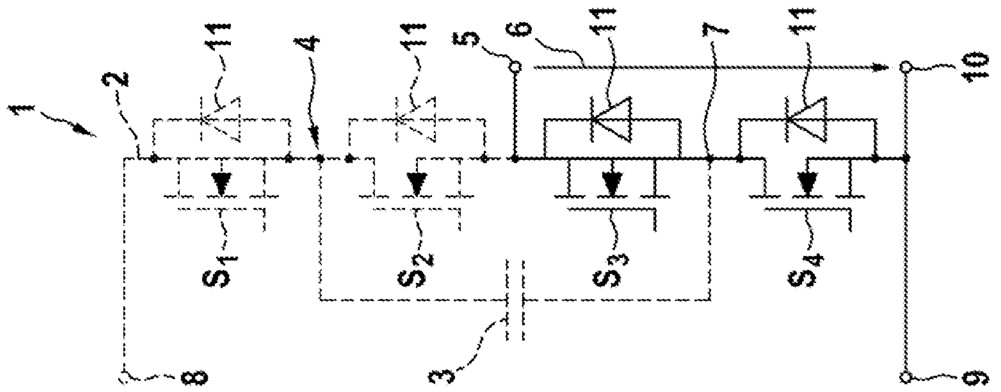

In FIG. 3, a switch-state defined or denoted as "ET−" is shown. Therein, switch three S3 and switch four S4 are ON. Further, switch one S1 and switch two S2 are OFF. As shown in FIG. 3, the voltage output 6 is zero, i.e. vinv=0.

Figure 4:
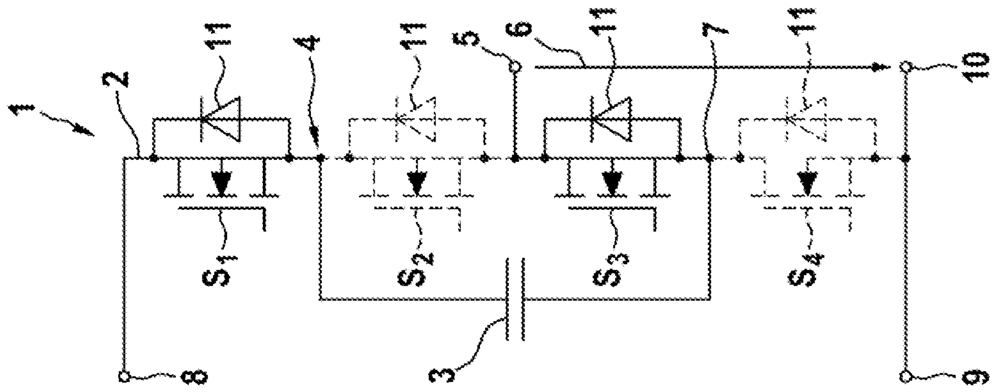

In FIG. 4, a switch-state defined or denoted as "FW+" is shown. Therein, switch one S1 and switch three S3 are ON. Further, switch two S2 and switch four S4 are OFF. As shown in FIG. 4, the voltage output 6 is vinv=Vin−Vfc. In the case of Vfc=Vin/2, the voltage output 6 is thus vinv=Vin/2.

Figure 5:
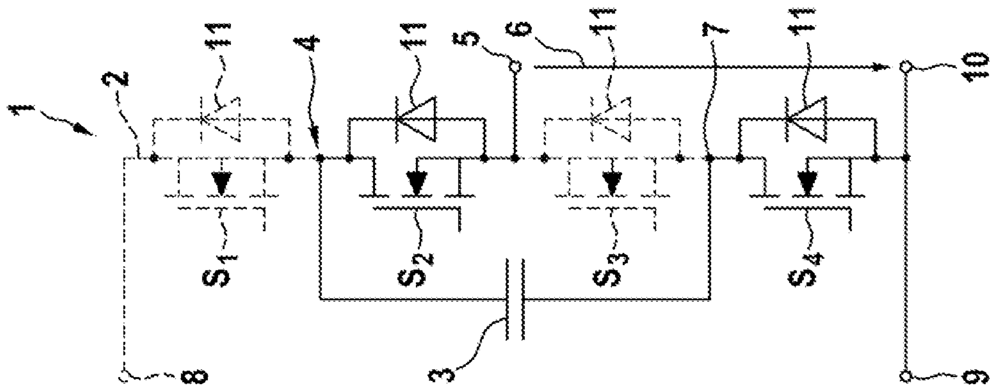
FIGS. 2-5 each show a switch-state of the flying-capacitor inverter according to the first embodiment of the present disclosure.

In FIG. 5, a switch-state defined or denoted as "FW−" is shown. Therein, switch two S2 and switch four S4 are ON. Further, switch one S1 and switch three S3 are OFF. As shown in FIG. 5, the output voltage 6 vine is equal to the voltage of the flying capacitor, i.e. vinv=Vfc=Vin/2.

Now, in the following, transitions between these switch-states for outputting an AC voltage from the inverter 1 will be discussed.

Figure 6:
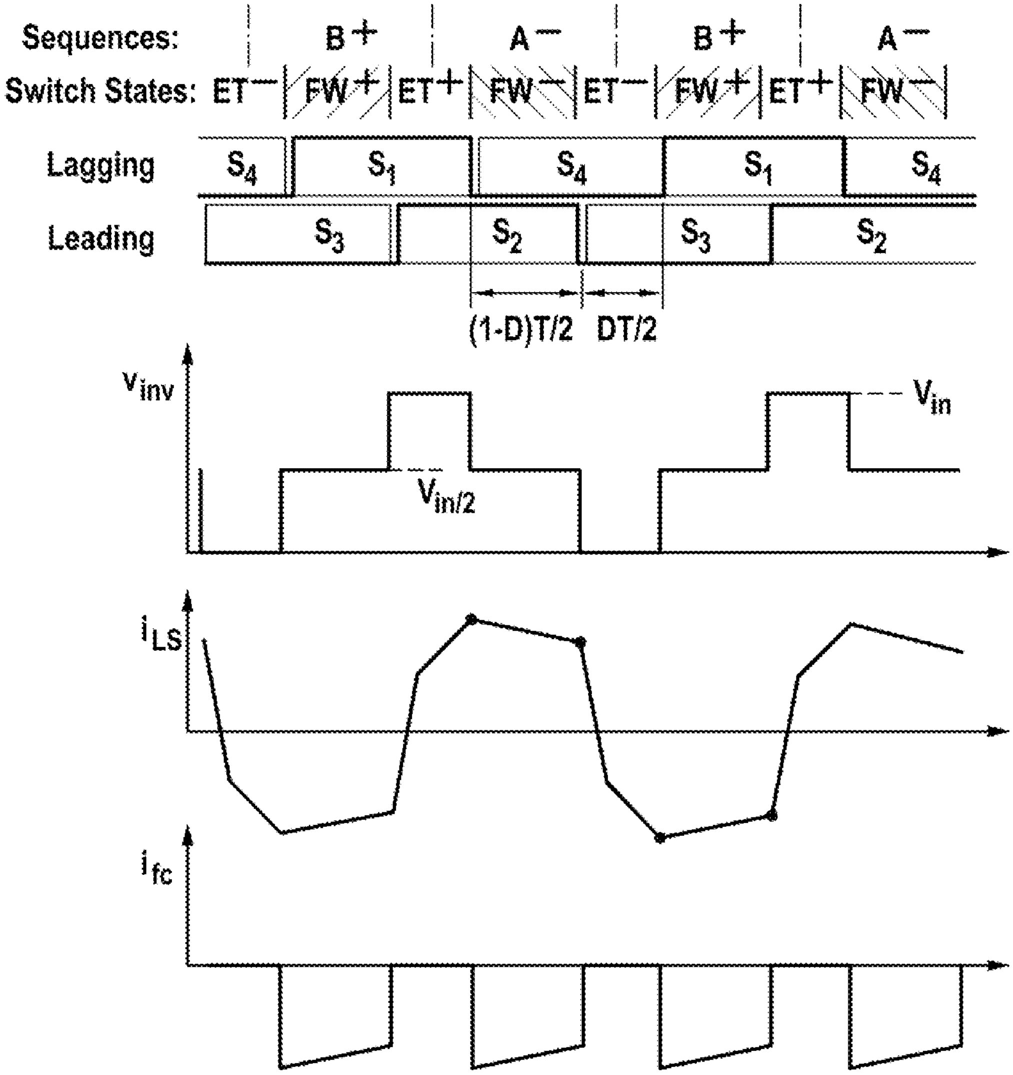
FIG. 6 shows a schematic diagram of switch-state transitions for switching the flying-capacitor inverter according to a first embodiment of a control method of the present disclosure as well as diagrams showing resulting voltage and current values.

FIG. 6 shows a schematic diagram of switch-state transitions B+, A− for switching the flying-capacitor inverter 1 according to a first embodiment of a control method of the present disclosure as well as diagrams showing resulting voltage vine and current values iLS, ifc.

In particular, the shown voltage vine is the output voltage vine of the inverter 1, which alternates with values vinv=0, vinv=Vin/2, and vinv=Vin, in accordance with the aforementioned switch-states. Further, the shown current iLS is a load to source current, output from the inverter 1 and shown lagging behind output voltage vine. Furthermore, the current ifc is the current flowing at the flying capacitor 3, which is a charge or discharge current corresponding with charging or discharging the flying capacitor 3.

FIG. 6 shows a phase-shift modulation comprising the transitions in order B+, A−.

At the top of FIG. 6, sequences of transitions B+, A−, i.e. repetitions of B+, A−, are shown. The transition B+, as also shown below ("switch states") corresponds to a transition from ET− to FW+ to ET+. Further, the transition A− corresponds to a transition from ET+ to FW− to ET−.

As clear from FIG. 6, when the sequence B+, A− is carried out, essentially, the ET+ and ET− switch-states are in common for B+, A−. In other words, these transitions essentially "share" these switch-states. In yet other words, the sequence B+, A− is defined by ET−, FW+, ET+, FW−, ET− . . . , etc., and not for instance ET−, FW+, ET+, ET+. FW−, ET−, ET−, . . . , etc. As can be taken from FIG. 6, these switch-states ET− and ET+ are also not held or kept switched for longer, as will be discussed with reference to a duty cycle D and time period T.

As illustrated in FIG. 6, the switch-states (for example FW−) are activated for a time (1−D)T/2 and (for example, ET−) for a time DT/2, wherein D is the duty cycle and T is a time period for the periodic voltage output vine. D is generally a value between and including zero (0) and T/2, i.e. 0≤D≤T/2. With respect to time period T, a length from one point on the vine curve to the corresponding periodic next point on the vine curve is a time period T. When added together, i.e. (1−D)T/2+DT/2, this results in T/2, i.e. half of a time period. The switches S1-S4 in this embodiment are ON for equal turn ON interval lengths.

Furthermore, FIG. 6 illustrates, due to the sequence of transitions, which switches are lagging (switch four S4 and switch one S1) and which are leading (switch three S3 and switch two S2).

With the control method shown in FIG. 6, the inverter 1 outputs the AC voltage vinv. The current ifc will be explained below.

Figure 7:
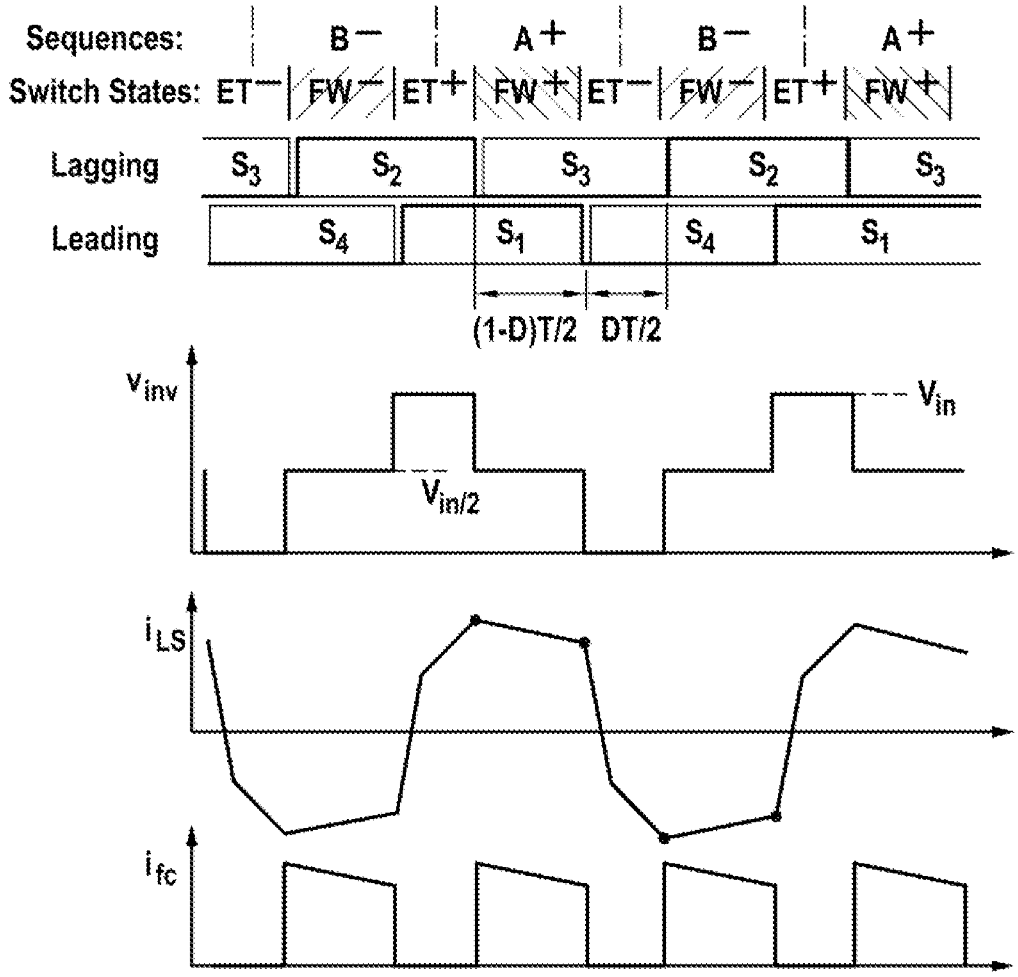
FIG. 7 shows a schematic diagram of switch-state transitions for switching the flying-capacitor inverter according to a second embodiment of a control method of the present disclosure as well as diagrams showing resulting voltage and current values.

FIG. 7 shows a schematic diagram of switch-state transitions B−, A+ for switching the flying-capacitor inverter 1 according to a second embodiment of a control method of the present disclosure as well as diagrams showing resulting voltage vine and current values iLS, ifc.

FIG. 7 also shows a phase-shift modulation, herein however comprising the transitions B−, A+.

As a comparison of FIG. 7 with FIG. 6 shows, FIG. 7 essentially shows switch three S3 and switch two S2 as lagging, and switch four S4 and switch one S1 as leading. Furthermore, in FIG. 7, a repetition of the transitions B−, A+ is shown, i.e. B−, A+, B−, A+. As also with FIG. 6, the turn ON intervals of the switches are (1−D)T/2 and DT/2. This results in the AC voltage vine between Vin, Vin/2, and vinv=0. The switches S1-S4 in this embodiment are ON for equal turn ON interval lengths.

With the control method shown in FIG. 7, the inverter 1 thus outputs the AC voltage vine.

As FIGS. 6 and 7 show, the phase-shift modulation results in a negative net current ifc (FIG. 6), i.e. the current ifc integrated over one or more time periods T, or a positive net current ifc (FIG. 7). Thereby, in FIG. 6, the flying capacitor 3 is discharged over time, whereas in FIG. 7, the flying capacitor 3 is charged over time. This is also referred to as flying capacitor voltage run-off.

In one embodiment, order to stabilize the flying capacitor 3 voltage Vfc, the control methods of FIGS. 6 and 7 are combined. Therein, it is periodically switched between the sequence of transitions B+, A− (FIG. 6) and B−, A+(FIG. 7), i.e. B+, A−, B−, A+, . . . , etc. It is also possible to switch with the sequence B−, A+, B+, A−. Thereby, the net current ifc integrated over multiple time periods T will be balanced by the negative current ifc shown in FIG. 6 and the positive current ifc shown in FIG. 7. In other words, in an implementation, the flying capacitor 3 is rapidly charged and discharged, respectively not fully, and thereby its voltage Vfc is kept stable.

Furthermore, the transition sequences B+, A− and the transition sequences B−, A+ can be repeated, either directly following one another (for example B+, A−, B−, A+, . . . , etc.) or via double repetitions (for example B+, A−, B+, A−, B−, A+, B−, A+, . . . , etc.) or triple or more repetitions. The amount of repetitions (double or triple or more) is not principally limited, but is set in accordance with characteristics of the flying capacitor 3 in an implementation such as its capacitance or in dependence of its voltage Vfc, which can be measured. In other words, in the control method, the voltage Vfc is measured in an implementation, and the transition sequences of FIGS. 6 and 7 switched in an implementation so as to balance and stabilize Vfc, to Vin/2 in an implementation.

In other words, in an implementation, the control methods according to the first embodiment and the second embodiment are combined, i.e. carried out in succession, so as to achieve a stable flying capacitor 3 voltage Vfc in an implementation. With such a sequence, the turn ON intervals of all switches S1-S4 can be kept equal to one another.

Figure 8:
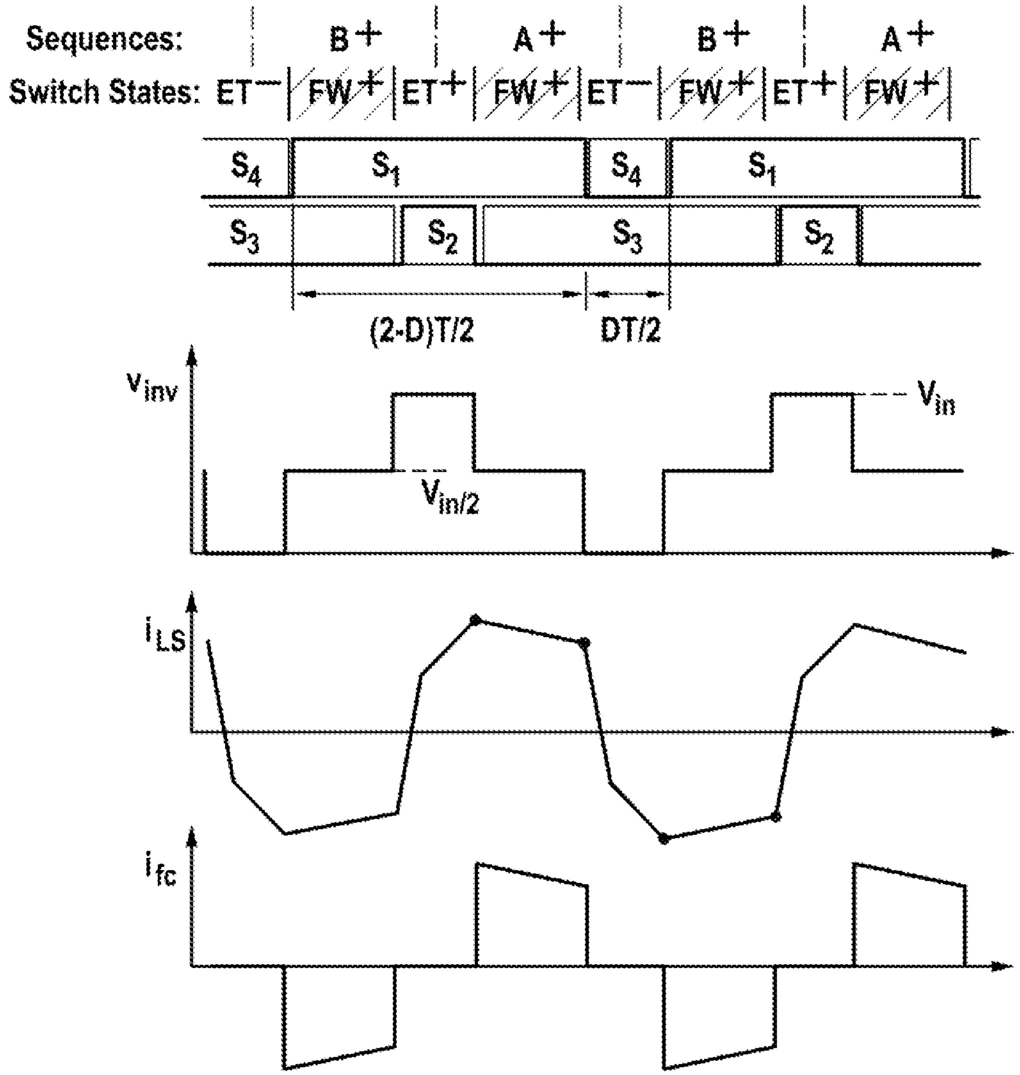
FIG. 8 shows a schematic diagram of switch-state transitions for switching the flying-capacitor inverter according to a third embodiment of a control method of the present disclosure as well as diagrams showing resulting voltage and current values.

FIG. 8 shows a schematic diagram of switch-state transitions B+, A+ for switching the flying-capacitor inverter 1 according to a third embodiment of a control method of the present disclosure as well as diagrams showing resulting voltage vine and current values iLS, ifc.

As shown in FIG. 8, in this control method, the sequence of transitions comprises B+, A+, B+, A+, . . . , etc.

As a comparison of FIG. 8 with FIGS. 6 and 7 shows, the control method of the present embodiment is characterized especially in that the turn ON interval lengths of the switches S1-S4 differ from one another. This is referred to as asymmetrical phase-shift modulation.

In particular, as shown for the case of switch one S1, switch one S1 is turned ON for a time period (2−D)T/2. Switch four S4 is turned ON for DT/2. Thus, for 0≤D≤T/2, switch one S1 is ON longer than switch four S4. This applies correspondingly to switch three S3, namely (2−D)T/2, and switch two S2, namely DT/2.

Via the sequence of transitions B+, A+, . . . , etc., as is shown via the flying capacitor current ifc, the current balances out within one time period T. Therefore, the flying capacitor 3 is, integrated over one period T, equally discharged and charged, such that its voltage Vfc stays constant, at Vin/2 in an implementation.

Figure 9:
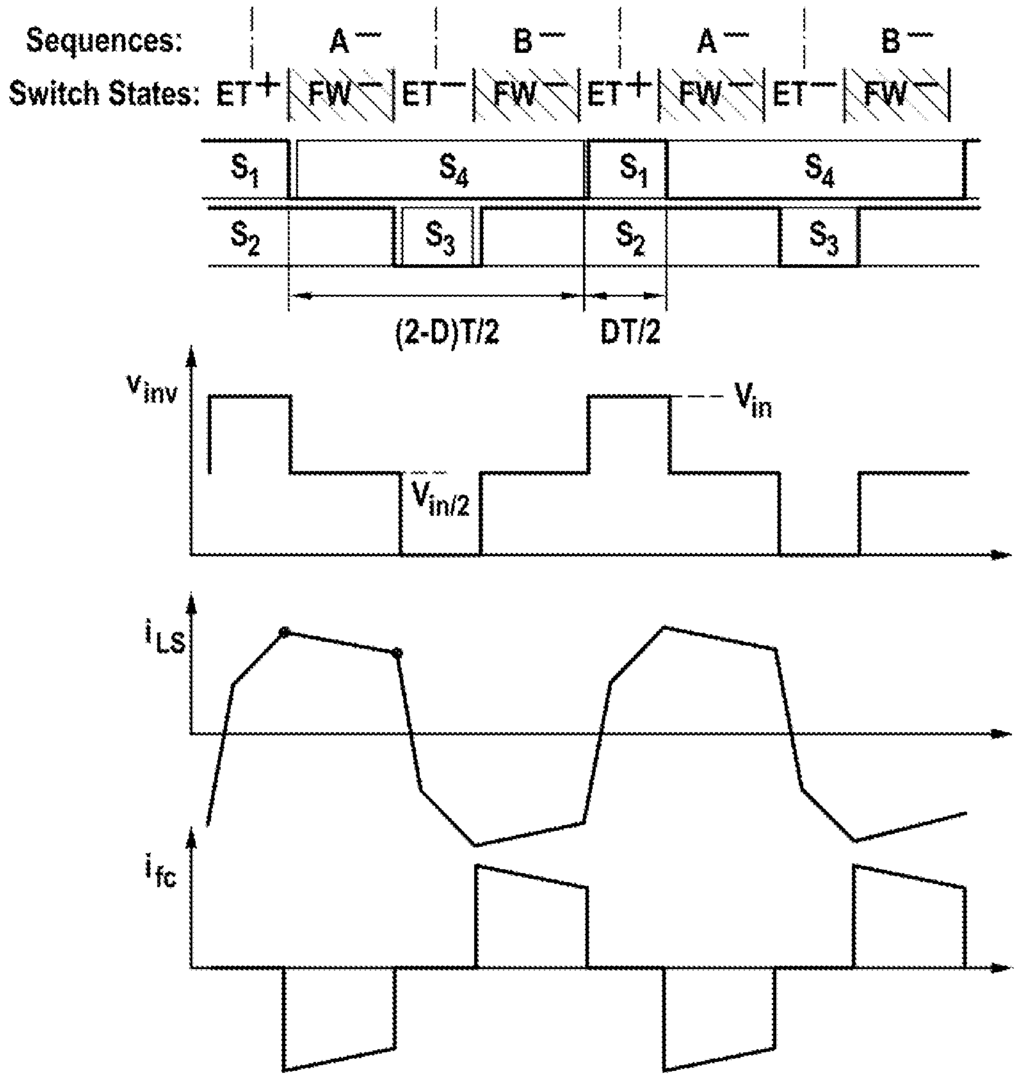
FIG. 9 shows a schematic diagram of switch-state transitions for switching the flying-capacitor inverter according to a fourth embodiment of a control method of the present disclosure as well as diagrams showing resulting voltage and current values.

FIG. 9 shows a schematic diagram of switch-state transitions A−, B− for switching the flying-capacitor inverter 1 according to a fourth embodiment of a control method of the present disclosure as well as diagrams showing resulting voltage vine and current values iLS, ifc.

As a comparison of FIG. 9 with FIG. 8 shows, FIG. 9 also shows asymmetrical phase-shift modulation.

The sequence of transitions shown is A−, B−, A−, B−, . . . , etc., i.e. a repetition of the sequence of transitions A−, B−.

Furthermore, turn ON intervals are different between the switches S1-S4. In particular, switch one S1 is ON for DT/2, whereas switch four S4 is ON for (2−D)T/2. Further, switch three S3 is ON for DT/2, whereas switch two S2 is ON for (2−D)T/2.

Thereby, also in this case, a net current ifc, integrated over one time period T, is zero, such that the voltage Vfc of the flying capacitor 3 stays constant, at Vin/2 in an implementation.

Further, the control method and/or the control device 200 can suitably switch between the sequences and timing of interval lengths shown in FIGS. 8 and 9, as also the case with switching between the control method of FIGS. 6 and 7. Thereby, the control method can reduce excessive heat generation in two switches (for example, in FIG. 8 in switch one S1 and switch three S3), and further balance out heat generation among all four switches S1-S4.

Figure 10:
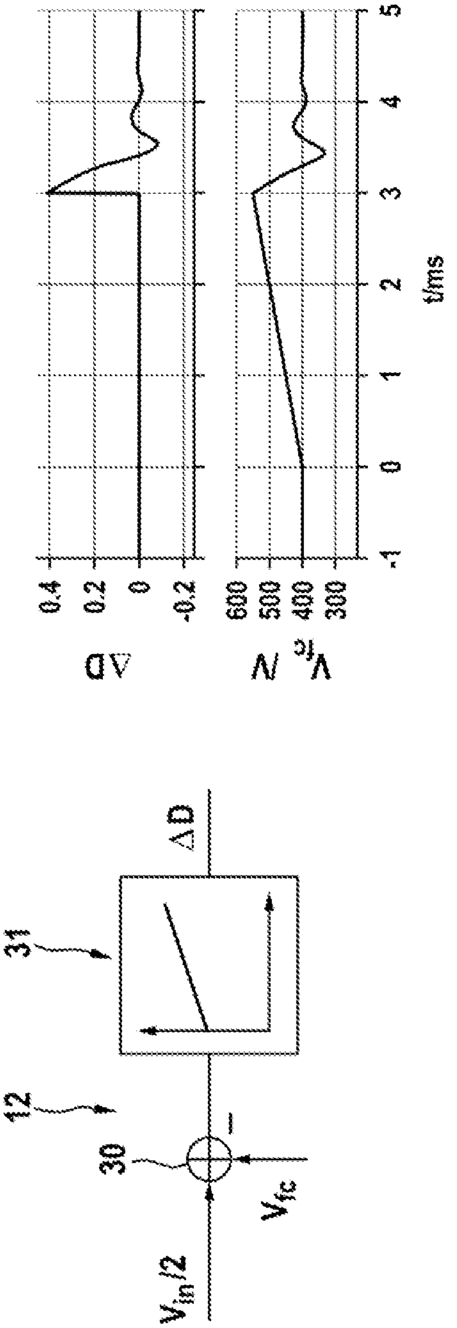
FIG. 10 shows a schematic diagram illustrating a logic control for adjusting a voltage of a flying capacitor of the flying-capacitor inverter and a resulting voltage value according to a fifth embodiment of a control method of the present disclosure.

FIG. 10 shows a schematic diagram illustrating a logic control 12 for adjusting a voltage of a flying capacitor 3 of the flying-capacitor inverter 1 and a resulting voltage value according to a fifth embodiment of a control method of the present disclosure.

In the foregoing, an embodiment combining (in succession or alternating) the control methods shown in FIGS. 6 and 7 was discussed for stabilizing the voltage vfc of the flying capacitor 3. In addition or alternatively thereto, the control method of FIG. 10 may be employed for stabilizing the voltage vfc. In other words, the control method of FIG. 10, as will be explained below, may suitably be employed to the control method of FIG. 6 and/or the control method of FIG. 7 so as to stabilize the voltage vfc and to prevent run-off thereof due to flying capacitor current ifc.

In the foregoing described control methods of FIGS. 6 to 9, the inverter 1 is controlled with a duty cycle D. In the present embodiment shown in FIG. 10, the inverter 1 is controlled with a duty cycle defined as D'=D+ΔD, wherein ΔD is an added duty cycle control value. Such a duty cycle control leads to delays in switching, i.e. phase-shifts, so as to vary the flying capacitor voltage vfc. In particular, the duty cycle control ΔD can also compensate for device tolerances, especially switching speed restrictions, so as to offset a run-off of the flying capacitor voltage vfc due to such device tolerances and/or so as to offset the run-off caused by the flying capacitor current ifc.

In the example shown in FIG. 10, in the control method of the present embodiment, the flying capacitor voltage vfc is compared to the input voltage Vin, more specifically half of the input voltage, Vin/2 via an addition operation 30. More precisely, the logic control circuit 12 calculates Vin/2−vfc (addition operator 30 with negative vfc).

The output value of Vin/2−vfc is input to a PI control unit 31. The PI control unit 31 outputs ΔD. As shown in the logic control 12, ΔD is added to the duty cycle D depending on the capacitor voltage vfc as compared to the input voltage Vin/2. ΔD in the present embodiment is set in linear dependence on vfc.

This is demonstrated in the graphs on the right side of FIG. 10. Therein, the top graph shows a set ΔD, and the bottom graph shows a measured flying capacitor voltage vfc. For the sake of demonstrating the effect of the control method according to this embodiment, the control (i.e. the setting of ΔD to non-zero) was started at t=3 ms.

As shown therein, from 0 to 3 ms, the flying capacitor voltage vfc increases gradually, i.e. experiences runs-off due to the flying capacitor current ifc shown in FIGS. 6 and 7. At 3 ms, the ΔD control is switched on. Therein, setting ΔD<0 results in the switch one S1 and the switch four S4 leading. Setting ΔD>0 results in the switch one S1 and the switch four S4 as lagging. Correspondingly, the switch two S2 and the switch three S3 lag for ΔD<0 and lead for ΔD>0.

Thus, in the case shown in FIG. 10, the logic control 12 sets ΔD>0, which leads to switch one S1 and switch four S4 as lagging. As shown in for example FIG. 6, this reduces vfc, as also demonstrated in the bottom graph of FIG. 10. In the present embodiment, the setting of ΔD for D'=D+ΔD stabilizes the flying capacitor voltage vfc to its intended value. In the present embodiment, with Vin=800 V, this results in vfc=400 V (Vin/2), as shown from t=4 ms to t=5 ms.

Therefore, in addition or alternatively to combining or alternating between the control sequences of FIGS. 6 and 7, the control method comprises the aforementioned setting of a ΔD in an implementation so as to balance the flying capacitor voltage vfc.

Figure 11:
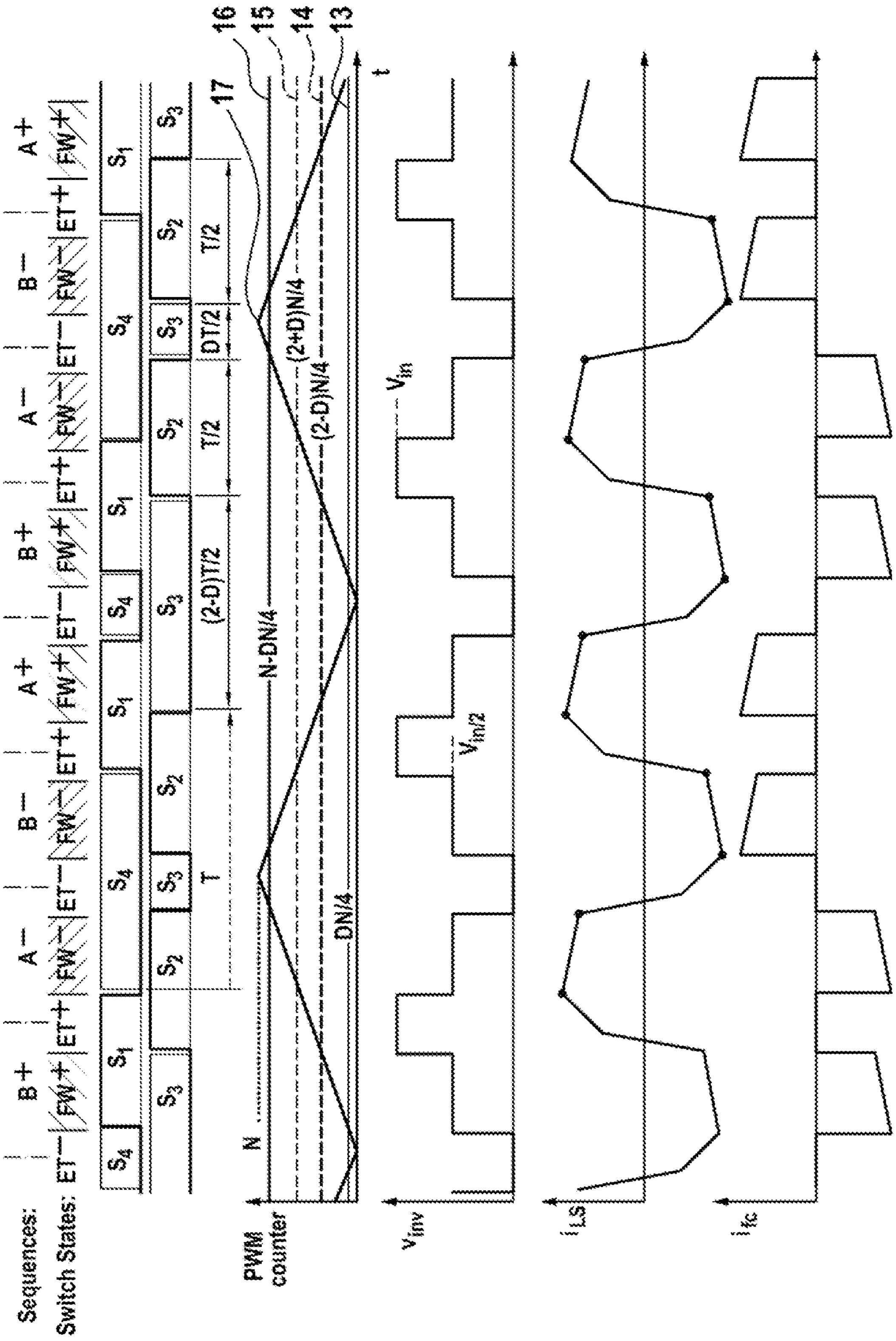
FIG. 11 shows a schematic diagram of switch-state transitions for switching the flying-capacitor inverter according to a sixth embodiment of a control method of the present disclosure as well as diagrams showing resulting voltage and current values.

FIG. 11 shows a schematic diagram of switch-state transitions B+, A−, B−, A+, B+, A−, B−, A+ for switching the flying-capacitor inverter 1 according to a sixth embodiment of a control method of the present disclosure as well as diagrams showing resulting voltage vine and current values iLS, ifc.

As can be taken therefrom, the sequence in this embodiment is B+, A−, B−, A+, B+, A−, B−, A+, . . . , etc. The phase-shift modulation of FIG. 11 is an example of asymmetrical phase-shift modulation, also referred to as three-level alternating asymmetrical phase-shift modulation.

Furthermore, the switching-state time periods are set as (2−D)T/2, T/2, DT/2, and T/2 within two periodic time periods 2T. As can be seen in FIG. 11, the ON intervals of the switches S1-S4 are alternatingly longer and short, so as to spread heat generation among the four switches S1-S4 essentially equally. Herein, a phase-shift between the switches S1, S4 and S2, S3 is T. For example, the time period between switch four S4 ON and switch three S3 ON and a next instance of switch four S4 ON and switch three ON is 1T.

In addition, FIG. 11 shows how such a control method is achieved via a two PWM units, shown in the PWM counter graph. Therein, the bottom PWM counter line 13 and the, from the top, second PWM counter line 15 correspond to a first PWM unit. The top PWM counter line 16 and the, from the top, third PWM counter line 14 correspond to a second PWM unit. Herein, the first PWM unit controls switching of switch one S1 and switch four S4. The second PWM unit controls switching of switch three S3 and switch two S2. The two PWM units are up-down counters. The PWM counter lines 13-16 correspond to PWM compare values.

As can be taken from FIG. 11, when a PWM count 17, starting at the very left at time slightly above zero, passes PWM counter line 13 in down direction, switch four S4 is switched ON and switch one S1 is switched OFF (not visible in FIG. 11, to the left of leftmost switch S4 ON), corresponding with transition from FW− to ET−. Further, when the PWM count 17 passes in up direction again through PWM counter line 13, switch four S4 is turned OFF and switch one S1 is turned ON. Thus, essentially, a height of the bottom PWM counter line 13, given by a value DN/4, wherein N is a variable, determines how long switch S4 is ON. The variable N corresponds, in PWM counter units, to a number of steps per time period, and may be normed such that for example N/T=1 or N/T=−1.

The phase-shift modulation control method sets N depending on the flying capacitor voltage vfc and depending on heat generation in each of the four switches S1-S4 in an implementation.

Further, when the PWM count 17 passes in up direction through line 14, switch three S3 is turned OFF and switch two S2 is turned on, corresponding to FW+ to ET+. Further, passing in up direction through PWM counter line 15 switches switch one S1 OFF and switch four S4 ON. Passing in up through PWM counter line 16 switches switch two S2 OFF and switch three S3 ON, wherein the height Nreg of PWM counter line 16 essentially determines the length of switch three S3 ON.

As shown in FIG. 11, the resulting current from the control method of this embodiment is balanced within one time period T, thereby providing a stable flying capacitor voltage vfc.

Figure 12:
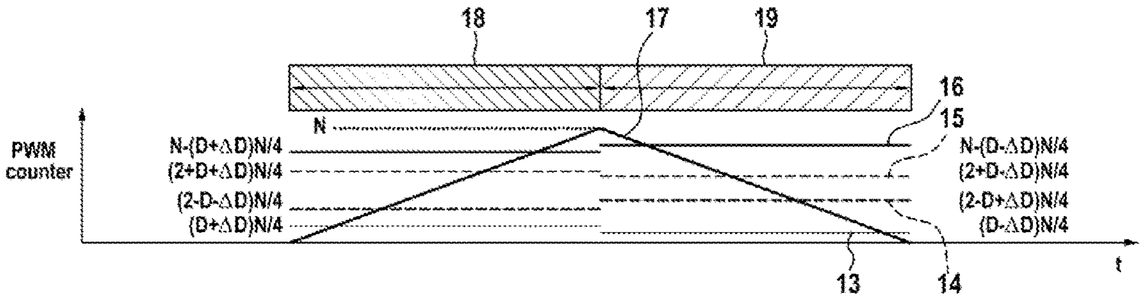
FIG. 12 shows a schematic diagram of switch-state transitions for switching the flying-capacitor inverter according to a seventh embodiment of a control method of the present disclosure.

FIG. 12 shows a schematic diagram of switch-state transitions for switching the flying-capacitor inverter 1 according to a seventh embodiment of a control method of the present disclosure.

In FIG. 12, the switch-states A, B are omitted, but are identical to those of FIG. 11 in an implementation. In FIG. 12, a further embodiment of PWM control is shown.

Therein, the PWM counter units are controlled so as to include the duty cycle control ΔD in dependence on a slope of the PWM count 17. During up-slope, the compare values of the PWM counter lines 13-16 correspond to: (D+ΔD)N/4, (2−D+ΔD)N/4, (2+D+ΔD)N/4, and N−(D+ΔD)N/4.

Once reaching the apex of N, the compare values of the PWM counter lines 13-16 are shifted to: (D−ΔD)N/4, (2−D+ΔD)N/4, (2+D−ΔD)N/4, and N−(D−ΔD)N/4.

Figure 13:
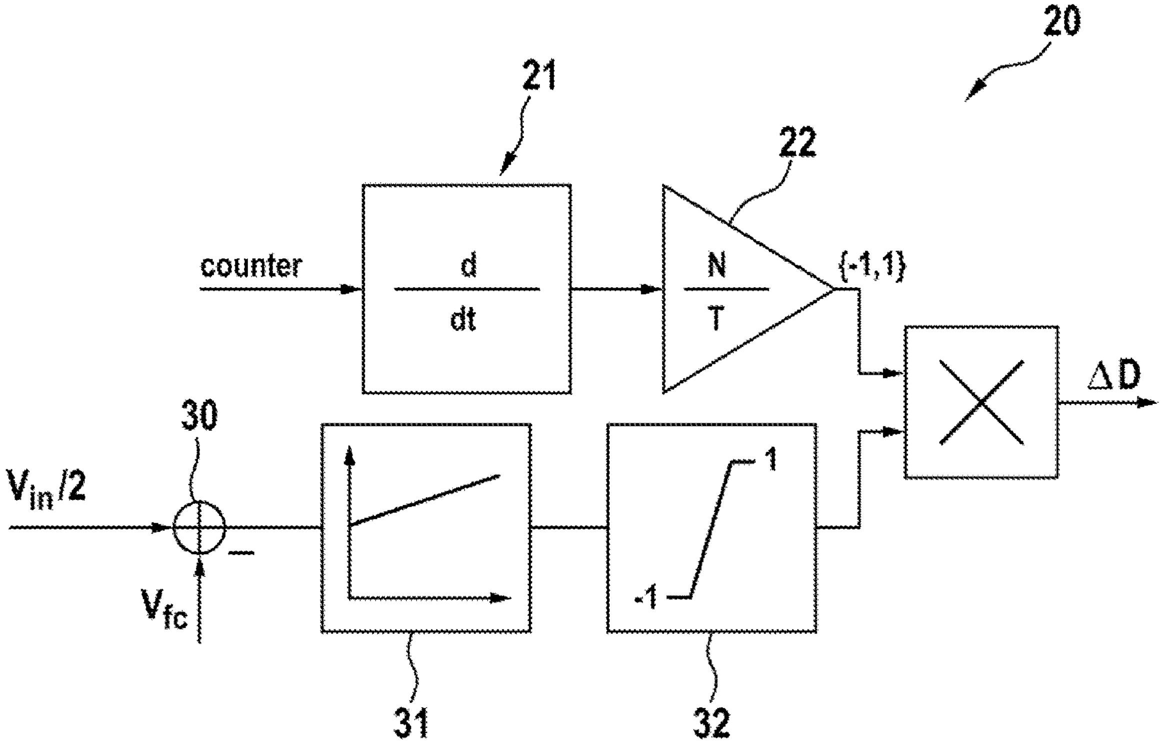
FIG. 13 shows a schematic diagram of a logic circuit for implementing the switch-state transitions for switching the flying-capacitor inverter according to the seventh embodiment of the control method of the present disclosure.

A logic circuit 20 for implementing this control method is shown in FIG. 13. Therein, FIG. 13 shows a schematic diagram of the logic circuit 13 for implementing the switch-state transitions for switching the flying-capacitor inverter 1 according to the seventh embodiment of the control method of the present disclosure.

As can be taken therefrom, the logic circuit 20 has, as an input, the PWM count, and calculates a slope thereof (d/dt operator 21). It then sets the value N/T via the operator 22 to either −1 or +1. Further, as also discussed with regard to FIG. 10, the present logic circuit 20 compares the flying capacitor voltage vfc with the input voltage Vin via the addition operator 30 and sets ΔD via the PI control unit 31. Further, a limiter 32 limits ΔD to between and including −1 and 1 and outputs a resulting ΔD.

Therefore, with reference again to FIG. 12, the compare values of the PWM units are shifted depending on the slope of the PWM count 17. An area or time period denoted by reference numeral 18 in FIG. 12 shows a time period in which the flying capacitor 3 is discharged, whereas reference numeral 19 shows a time period in which the flying capacitor 3 is charged. With the control method of the present embodiment, charging periods or intervals of the flying capacitor 3 are increased, thereby further providing advantageous balancing of the flying capacitor voltage vfc.

Figure 14:
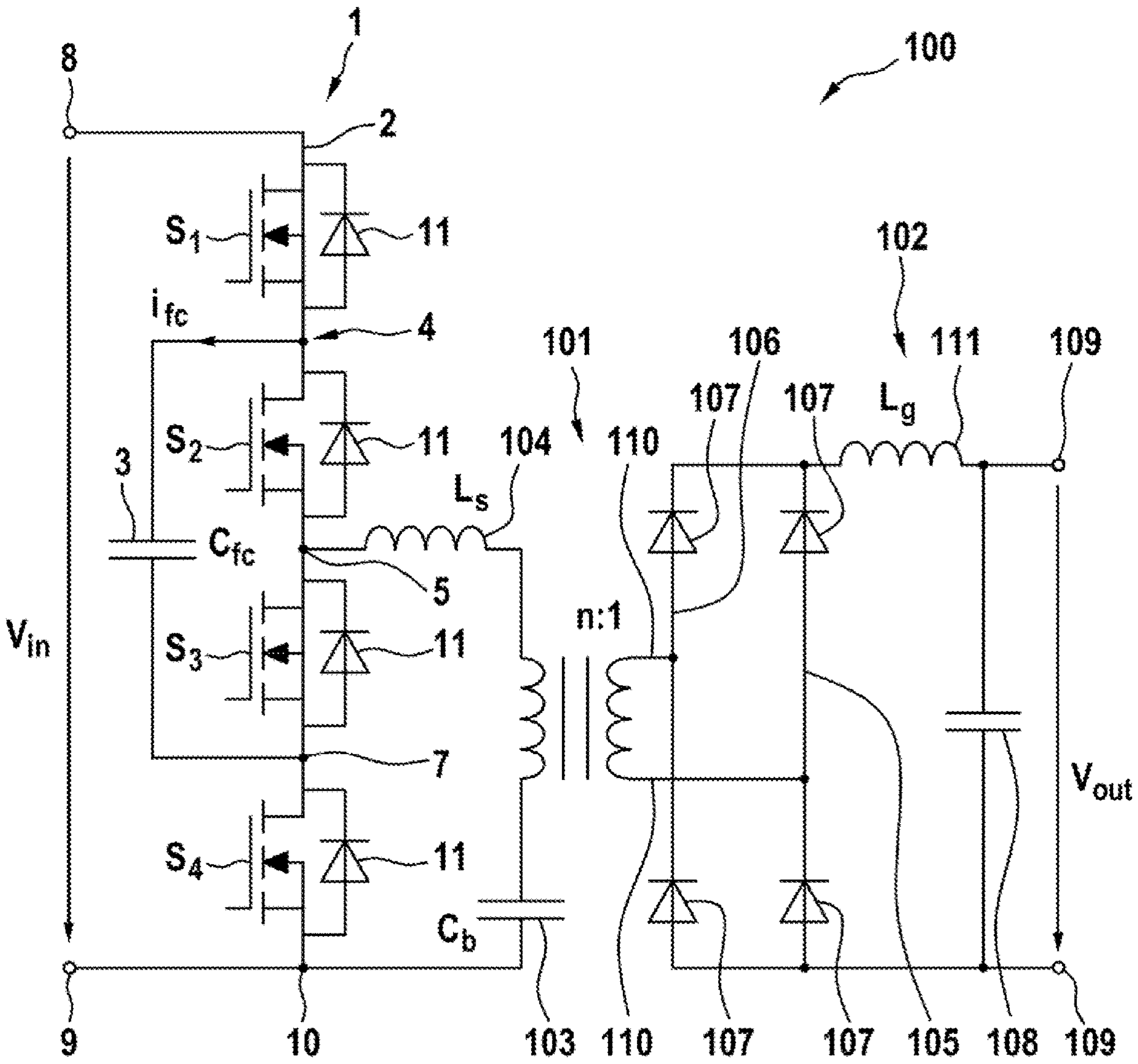
FIG. 14 shows a circuit diagram of a first embodiment of a multi-level phase-shift converter according to the present disclosure.
Figure 16:
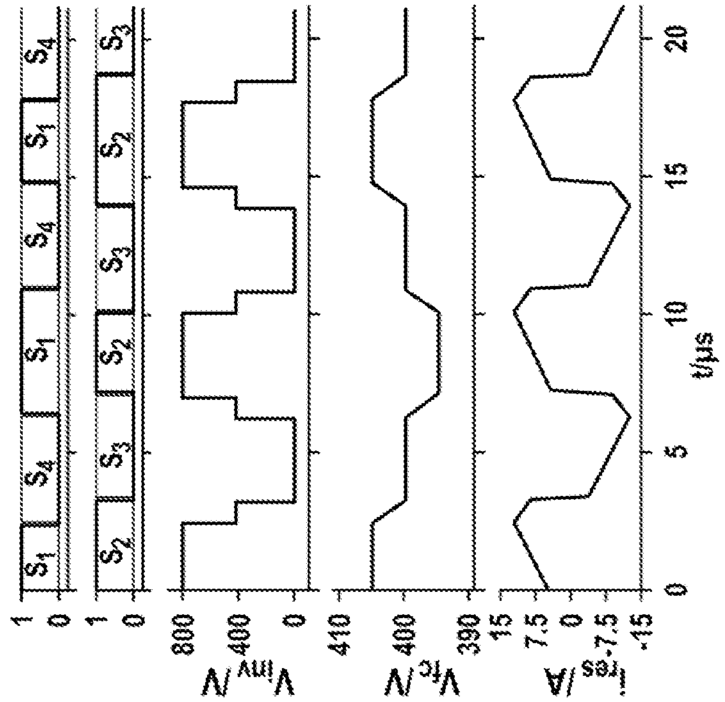
FIGS. 15 and 16 show switch states and value results for the multi-level phase-shift converter of the first embodiment of the present disclosure.
Figure 15:
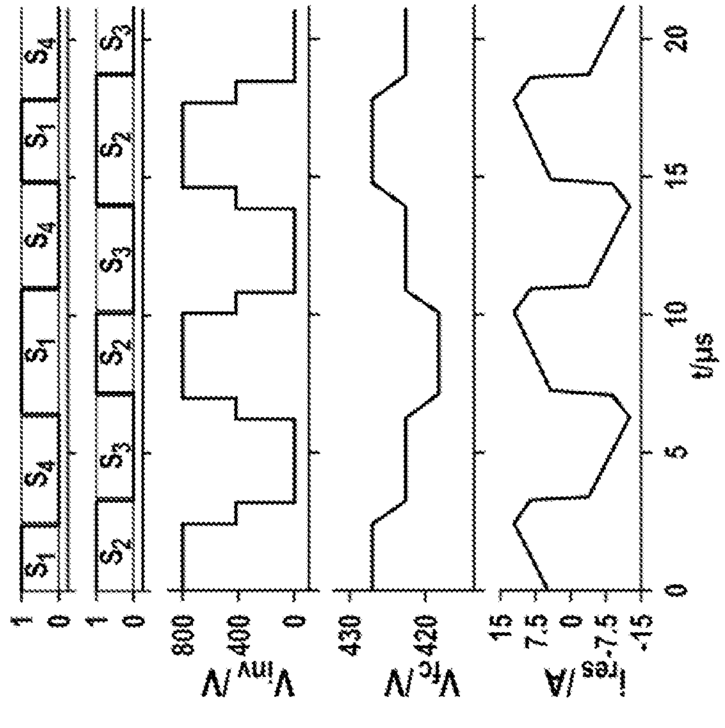

FIG. 14 shows a circuit diagram of a first embodiment of a multi-level phase-shift converter 100 according to the present disclosure. FIGS. 15 and 16 show switch states S1-S4 and value results for the multi-level phase-shift converter 100 of the first embodiment of the present disclosure. For an exact description of the multi-level phase-shift converter 100 of the present embodiment, FIG. 14 is explicitly referred to.

As shown in the circuit diagram of FIG. 14, the multi-level phase-shift converter 100 (in the following "converter 100") comprises the inverter 1, a transformer 101, and a rectifier circuit 102. The converter 100 further comprises, between an input of the transformer 101 and the second output terminal 10 of the inverter 1, a blocking capacitor 103 with a large capacitance such that the voltage is fairly constant. The blocking capacitor 103 is configured to block half the input voltage.

Further, the first output terminal 5 of the inverter 1 is connected, via an inductance 104 (Ls) to an input of the transformer 101. Outputs 110 of the transformer 101 are connected respectively to diode legs 105, 106, each comprising two diodes 107 connected in series directly with one another. Further, the converter 100 comprises an output inductance 111 and an output capacitor 108.

Essentially, the converter 100 of the present embodiment is a phase-shifted full bridge converter with the flying capacitor inverter 1.

The converter 100 of the present embodiment further comprises the control device (not shown in FIG. 14) connected to the gates of the four switches S1-S4 and configured to implement the control method of the foregoing embodiments.

Further, FIGS. 15 and 16 shows voltages vfc and vine as well as a resulting current ires. The current ires is the current at a load connected to the converter 100 of the present embodiment, vfc is the flying capacitor voltage, and vine is the voltage output by the inverter 1 of the converter 100. In particular, FIG. 15 shows an unbalanced operation, in which an undesired delay of 20 ns for switch one S1 is caused, so as to demonstrate an undesirable flying capacitor voltage vfc. The voltage input for the inverter 1 herein is 800 V. As can be taken from FIG. 15, the flying capacitor voltage vfc strongly varies from 400 V, i.e. from Vin/2.

On the other hand, FIG. 16 shows the balanced operation, in which the control methods according to the foregoing embodiments were implemented in the converter 100. As can be taken therefrom, the flying capacitor voltage vfc is, within acceptable tolerances, stable at 400 V, i.e. Vin/2, especially when integrated over a longer time.

Figure 17:
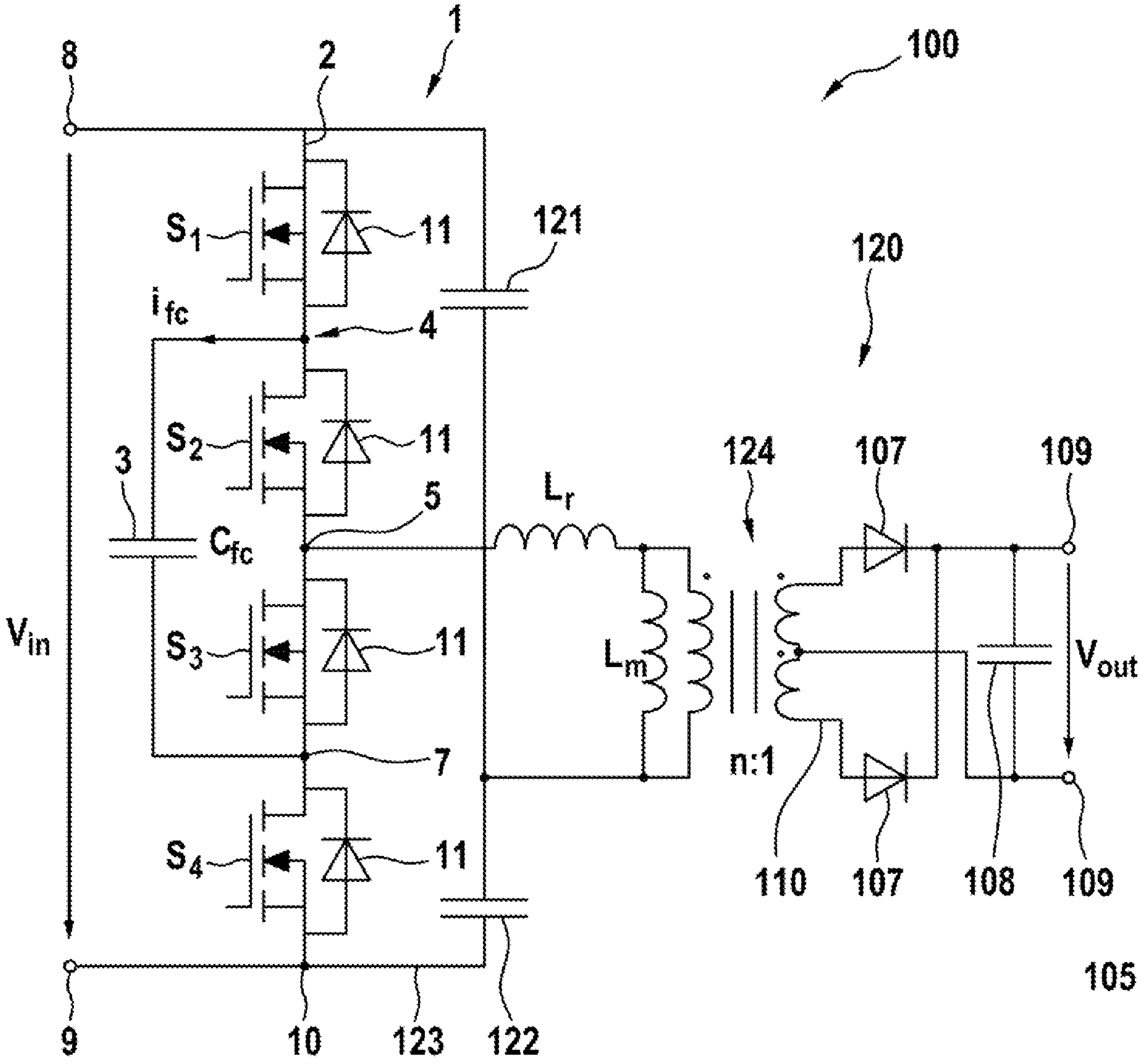
FIG. 17 shows a circuit diagram of a second embodiment of a multi-level phase-shift converter according to the present disclosure.
Figure 18:
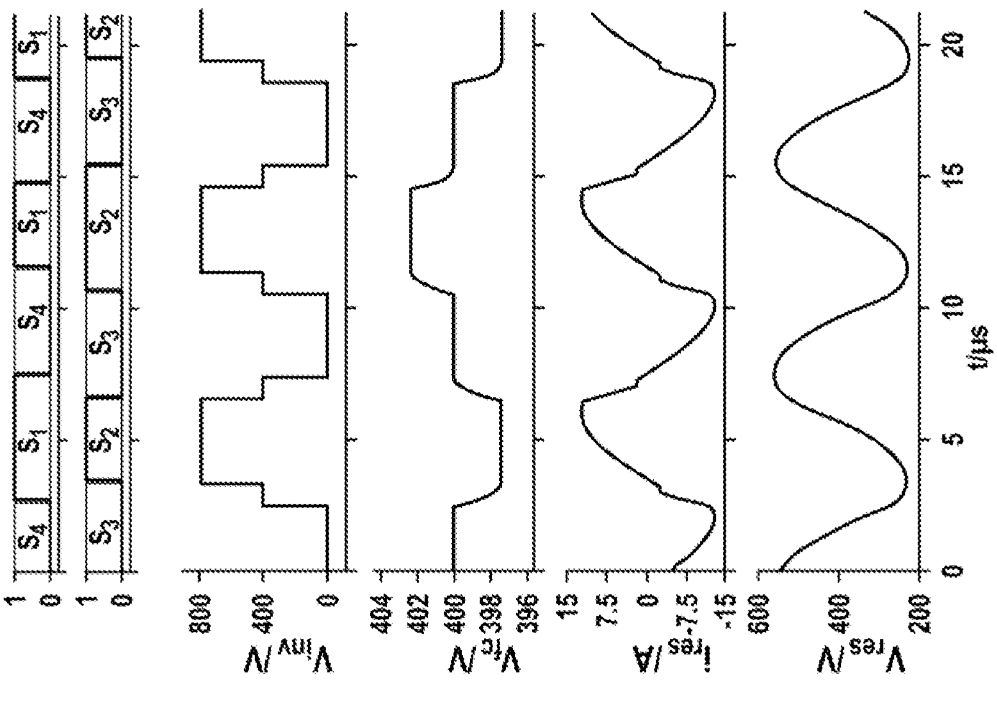
FIGS. 18 and 19 show switch states and value results for the multi-level phase-shift converter of the second embodiment of the present disclosure.
Figure 19:
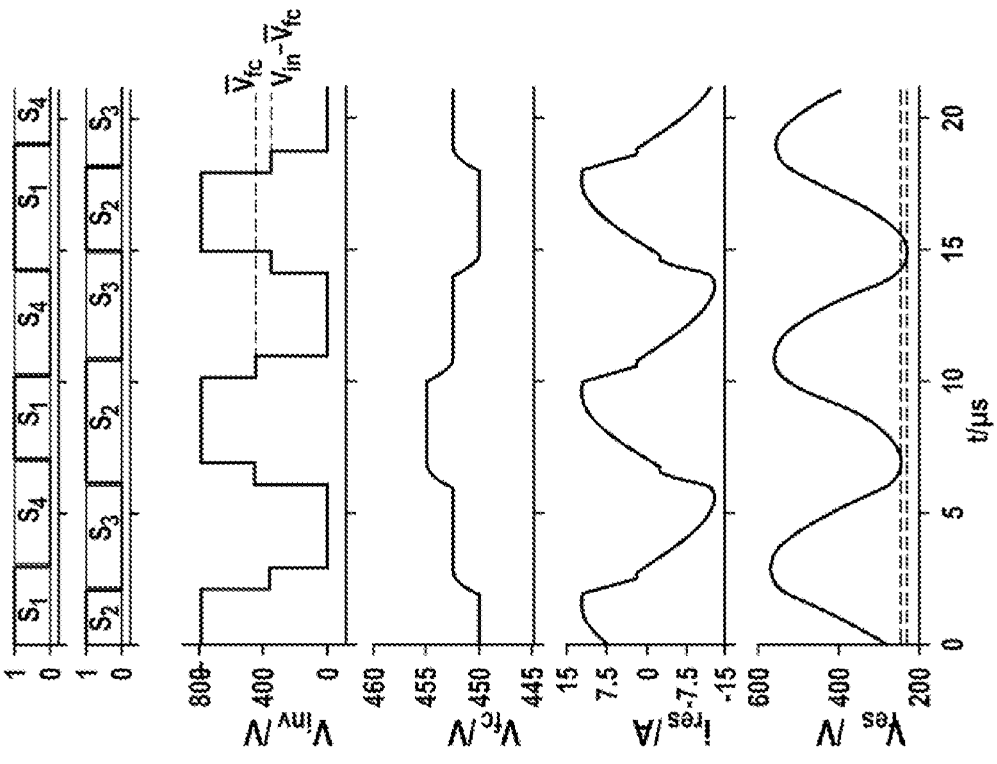

FIG. 17 shows a circuit diagram of a second embodiment of a multi-level phase-shift converter 100 according to the present disclosure. FIGS. 18 and 19 show switch states and value results for the multi-level phase-shift converter 100 of the second embodiment of the present disclosure. For an exact description of the multi-level phase-shift converter 100 of the present embodiment, FIG. 17 is explicitly referred to.

The converter 100 according to the second embodiment comprises the flying-capacitor inverter 1 and a half-bridge LLC resonant converter 120. Therein, the converter 100 further includes a splitted resonant capacitor (together constituting the "C" in "LLC resonant converter") formed by two capacitors 121 and 122.

The capacitors 121, 122 are connected, via a capacitor leg 123, in parallel with the four switches S1-S4, i.e. in parallel with the switch leg 2, as well as with the input terminals 8, 9 of the inverter 1. The inputs of the LLC resonant converter 120, i.e. the transformer 124 thereof, are connected to the switch leg 2, i.e. the first output terminal 5 of the inverter 1, and a splitted resonant capacitor leg 123.

Similar to FIGS. 15 and 16, FIGS. 18 and 19 show current and voltage results for the converter 100 of the present embodiment. In particular, FIGS. 18 and 19 show resulting voltages vine, vfc, and vres, wherein vine is the voltage output by the inverter 1, vfc is the flying capacitor voltage, and vres is the voltage output by the converter 100, i.e. output by the LLC resonant converter 120. Further, the current ires is a current at a load connected to the LLC resonant converter 120 of the converter 100.

Therein, FIG. 19 shows the unbalanced operation, in which the voltage of the flying capacitor 3 is not balanced in accordance with the foregoing embodiments of control methods. As can be taken therefrom, the voltage vfc varies greatly from Vin/2, which also in this case is (or should be) 400 V (compare with vine). Herein, an undesired phase shift of 80 ns is introduced for switches one S1 and four S4.

FIG. 18 on the other hand shows the balancing operation according to any one of the foregoing described embodiments of the control method. As can be taken therefrom, the voltage vfc of the flying capacitor vfc is stable around 400 V, corresponding to Vin/2, especially when integrated over time. Thus, no run-off of flying capacitor voltage vfc is caused.

Thus, FIG. 18 demonstrates the use of the control method and its advantages when employed in a multi-level phase-shift converter 100 with a flying-capacitor inverter 1 and an LLC resonant converter 120.

In addition to the foregoing written explanations, it is explicitly referred to FIGS. 1 to 19, wherein the figures in detail show circuit diagrams and switching modulation configurations and sequences.

What is claimed is:

1. A flying-capacitor inverter, comprising a switch leg with four switches, a flying capacitor connected to the switch leg, an output between pairs of the four switches, and a control device connected to each of the four switches, wherein the control device is configured to employ phase-shift modulation to switch the four switches such that switching signals for a first switch and a fourth switch of the four switches are phase shifted to the switching signals for a second switch and a third switch of the four switches, and wherein:

a switch-state of the first switch and the second switch being ON is defined as switch-state ET+;

a switch-state of the third switch and the fourth switch being ON is defined as switch-state ET−;

a switch-state of the first switch and the third switch being ON is defined as switch-state FW+; and a switch-state of the second switch and the fourth switch being ON is defined as switch-state FW−;

wherein the phase-shift modulation is a sequence comprising all of the switch-states ET+, ET−, FW+and FW−.

2. The flying-capacitor inverter according to claim 1, wherein;

a transition from switch-state ET+ to ET− is defined as transition A;

a transition from switch-state ET− to ET+ is defined as transition B;

the transition A with an interposed switch-state FW+ is defined as A+;

the transition A with an interposed switch-state FW− is defined as A−;

the transition B with an interposed switch-state FW+ is defined as B+; and the transition B with an interposed switch-state FW− is defined as B−.

3. The flying-capacitor inverter according to claim 2, wherein the control device is configured to employ phase-shift modulation comprising the transitions of any combination of followings:

a repetition in order of B+, A−;

a repetition in order of B−, A+;

in order of B+, A−, B−, A+;

in order of B−, A+, B+, A−;

repetitions thereof.

4. The flying-capacitor inverter according to claim 2, wherein the control device is configured to employ symmetrical phase-shift modulation in which turn ON interval lengths of the four switches are equal.

5. The flying-capacitor inverter according to claim 4, wherein the control device is configured to, in the symmetrical phase-shift modulation, set turn ON interval lengths of the four switches to (1−D) T/2 and DT/2, wherein D is a duty cycle and T is a time period of a periodic voltage output by the flying-capacitor inverter.

6. The flying-capacitor inverter according to claim 2, wherein the control device is configured to employ asymmetrical phase-shift modulation in which turn ON interval lengths of the four switches differ from one another.

7. The flying-capacitor inverter according to claim 6, wherein the control device is configured to, in the asymmetrical phase-shift modulation, alter turn ON interval lengths of the four switches between DT/2 and (2μD) T/2, wherein D is a duty cycle and T is a time period of a periodic voltage output by the flying-capacitor inverter.

8. The flying-capacitor inverter according to claim 6, wherein the control device is configured to employ alternating-asymmetrical phase-shift modulation in which comprises both the transitions in order B+, A− and the transitions in order B−, A+.

9. The flying-capacitor inverter according to claim 8, wherein the control device is configured to, in the alternating-asymmetrical phase-shift modulation, set turn ON intervals of the respective switches to (2−D) T/2, T/2, DT/2, and T/2 for two sequential time periods T with a duty cycle D.

10. The flying-capacitor inverter according to claim 1, wherein the control device is configured to control one or more of transitions of switch-states in dependence of a measured current (ifc) flowing through the flying capacitor and/or control one or more of transitions of switch-states in dependence of a measured voltage (vfc) of the flying capacitor.

11. The flying-capacitor inverter according to claim 1, wherein the control device is configured to control one or more transitions by adding a duty cycle control $\Delta D$ to the duty cycle D of the four switches.

12. The flying-capacitor inverter according to claim 1, wherein the control device is configured to control timing of one or more transitions by adding a duty cycle control $\Delta D$ to the duty cycle D of the four switches.

13. The flying-capacitor inverter according to claim 1, wherein the control device comprises two pulse width modulation (PWM) counter units, each of which being configured to control a switch-state of two switches out of the four switches.

14. A multi-level phase-shift converter, comprising a flying-capacitor inverter according to claim 1, and further comprising:

a transformer with a rectifier circuit;

or a half-bridge LLC resonant converter.

15. The multi-level phase-shift converter according to claim 14, wherein the transformer is provided with a blocking capacitor or the half-bridge LLC resonant converter is provided with a splitted resonant capacitor.

16. A phase-shift modulation method for controlling a flying-capacitor inverter according to claim 1, comprising:

configuring the flying-capacitor inverter with modulation configuration in which:

a switch-state of the first switch and the second switch being ON is defined as switch-state ET+;

a switch-state of the third switch and the fourth switch being ON is defined as switch-state ET−;

a switch-state of the first switch and the third switch being ON is defined as switch-state FW+; and a switch-state of the second switch and the fourth switch being ON is defined as switch-state FW−;

employing a phase-shift modulation to switch the four switches such that switching signals for a first switch and a fourth switch of the four switches are phase-shifted to the switching signals for a second switch and a third switch of the four switches;

wherein the phase-shift modulation is a sequence comprising all of the switch-states ET+, ET−, FW+ and FW−.

17. The phase-shift modulation method according to claim 16, wherein:

a transition from switch-state ET+ to ET− is defined as transition A;

a transition from switch-state ET− to ET+ is defined as transition B;

the transition A with an interposed switch-state FW+ is defined as A+;

the transition A with an interposed switch-state FW− is defined as A−;

the transition B with an interposed switch-state FW+ is defined as B+; and the transition B with an interposed switch-state FW− is defined as B−.

18. The phase-shift modulation method according to claim 16, wherein the phase-shift modulation comprises the transitions of any combination of followings:

a repetition in order of B+, A−;

a repetition in order of B−, A+;

in order of B+, A−, B−, A+;

in order of B−, A+, B+, A−;

repetitions thereof.

19. The phase-shift modulation method according to claim 17, further comprises:

employing symmetrical phase-shift modulation in which turn ON interval lengths of the four switches are equal, and setting turn ON interval lengths of the four switches to (1−D) T/2 and DT/2, wherein D is a duty cycle and T is a time period of a periodic voltage output by the flying-capacitor inverter.

20. The phase-shift modulation method according to claim 17, further comprises:

employing asymmetrical phase-shift modulation in which turn ON interval lengths of the four switches differ from one another; and altering turn ON interval lengths of the four switches between DT/2 and (2−D) T/2, wherein D is a duty cycle and T is a time period of a periodic voltage output by the flying-capacitor inverter.

* * * * *